(12) United States Patent
Slushtz et al.

(10) Patent No.: US 10,785,600 B2
(45) Date of Patent: Sep. 22, 2020

(54) SYSTEM, DEVICE, AND METHOD OF NAVIGATION IN TRACKS

(71) Applicant: REC N' TREK LTD., Jerusalem (IL)

(72) Inventors: Yakov Slushtz, Jerusalem (IL); Bezalel Yair Lenzizky, Jerusalem (IL)

(73) Assignee: REC N' TREK LTD., Jerusalem (IL)

( * ) Notice: Subject to any disclaimer, the term of this patent is extended or adjusted under 35 U.S.C. 154(b) by 0 days.

(21) Appl. No.: 16/301,741

(22) PCT Filed: May 28, 2017

(86) PCT No.: PCT/IL2017/050590
§ 371 (c)(1),
(2) Date: Nov. 15, 2018

(87) PCT Pub. No.: WO2017/212472
PCT Pub. Date: Dec. 14, 2017

(65) Prior Publication Data
US 2019/0215660 A1 Jul. 11, 2019

Related U.S. Application Data

(60) Provisional application No. 62/345,870, filed on Jun. 6, 2016.

(51) Int. Cl.
*H04W 4/024* (2018.01)
*H04W 4/029* (2018.01)
*H04W 4/021* (2018.01)

(52) U.S. Cl.
CPC ........... *H04W 4/024* (2018.02); *H04W 4/021* (2013.01); *H04W 4/029* (2018.02)

(58) Field of Classification Search
CPC . H04W 76/27; H04W 26/0268; H04W 72/10; H04W 84/042; H04W 28/08;
(Continued)

(56) References Cited

U.S. PATENT DOCUMENTS 5,627,549 A * 5/1997 Park .................. G01C 21/26
340/996
5,898,390 A * 4/1999 Oshizawa ............. G01C 21/28
340/988

(Continued)

FOREIGN PATENT DOCUMENTS

WO 2012/143300 A1 10/2012
WO 2015030897 3/2015

OTHER PUBLICATIONS

Communication from the European Patent Office (EPO) in patent application EP 17809836, dated Jun. 21, 2019.

(Continued)

*Primary Examiner* — Nimesh Patel
(74) *Attorney, Agent, or Firm* — Eitan Mehulal Sadot

(57) ABSTRACT

Devices, systems, and methods of navigation in tracks and trails. A system includes a smartphone or other portable electronic device. The system generates and provides navigation data and mapping data to travelers, particularly in walking trails; and generates a video clip or other multimedia presentation that incorporates trip data, images, audio, and a reconstructed map of the route. An administrator or operator of a nature center or an attraction or other venue, operates the system to obtain real-time information about travelers within the venue, and to selectively provide data and messages to some or all of such travelers.

17 Claims, 11 Drawing Sheets

(58) Field of Classification Search
CPC ........... H04W 40/005; H04W 72/1242; H04W 88/02; H04W 28/0236; H04W 28/0284; H04W 28/0289; H04W 64/003; H04W 48/04; H04W 4/02; H04W 4/22; H04W 88/06; H04W 48/02; H04W 48/06; H04W 48/08; H04W 48/12; H04W 28/10; H04W 36/22; H04W 36/32; H04W 4/00; H04W 4/021; H04W 4/027; H04W 60/04; H04W 64/006; H04W 72/0486; H04W 76/007; H04W 40/20; H04W 48/10; H04W 4/023; H04W 4/08; H04W 52/0216; H04W 72/0493; H04W 72/06; H04W 72/1252; H04W 8/18; H04W 4/80; H04W 12/06; H04W 36/0033; H04W 12/08; H04W 12/12; H04W 64/00; H04W 4/029; H04W 4/04; H04W 4/21; H04W 84/12; H04W 4/12; H04W 4/025; H04W 4/60; H04W 52/0251; H04W 68/00; H04W 4/024; H04L 43/16; H04L 43/0876; H04L 43/0882; H04L 65/1016; H04L 47/20; H04L 47/805; H04L 12/1407; H04L 67/12; H04L 67/2847; H04L 63/0853; H04L 2012/2849; H04L 63/0861; H04L 67/04; H04L 43/08; H04L 12/2854; H04L 51/02; H04L 51/046; H04L 63/105; H04L 63/12; Y02D 70/1242; Y02D 70/1262; Y02D 70/142; Y02D 70/144; Y02D 70/146; Y02D 70/164; Y02D 70/1224; Y02D 70/1226; Y02D 70/1264; Y02D 70/168; Y02D 70/23; Y02D 70/24; Y02D 70/26; Y02D 70/00; Y02D 70/166; H04M 1/72577; H04M 1/67; H04M 1/72563; H04M 1/72569; H04M 1/72572; H04M 2242/04; H04M 2242/30; H04M 2250/02; H04M 1/6075; H04M 2250/74; H04M 1/7253; H04M 1/72552; H04M 2250/14; H04M 1/271; H04M 1/6066; H04M 1/66; H04M 1/72533; H04M 1/7258; H04M 11/007; H04M 2201/40; H04M 2250/12; H04M 2250/52; H04M 1/72522; H04M 1/0266; H04M 2250/10; H04M 1/6505; H04M 19/04; H04M 2250/60; H04M 1/64; H04M 3/533; H04M 3/42; H04Q 2213/13098; H04Q 2213/13164; H04Q 3/0091; B60W 2050/146; B60W 2550/308; B60W 2720/10; B60W 2750/308; B60W 30/146; B60W 30/16

See application file for complete search history.

(56) References Cited

U.S. PATENT DOCUMENTS

| | | | |
|---|---|---|---|
| 9,503,849 B1* | 11/2016 | Gavade | H04W 4/021 |
| 2005/0075119 A1 | 4/2005 | Sheha | |
| 2008/0201074 A1 | 8/2008 | Bleckman | |
| 2008/0262717 A1* | 10/2008 | Ettinger | G01C 21/3476 701/467 |
| 2009/0157566 A1* | 6/2009 | Grush | G01C 21/28 705/400 |
| 2012/0232793 A1* | 9/2012 | Hagiwara | G01C 21/28 701/518 |
| 2013/0183924 A1* | 7/2013 | Saigh | A61K 9/0063 455/404.2 |
| 2014/0058666 A1 | 2/2014 | Sheha | |
| 2014/0087708 A1* | 3/2014 | Kalita | H04W 4/04 455/418 |
| 2014/0365127 A1* | 12/2014 | Poduri | G01C 21/00 701/537 |
| 2014/0378159 A1 | 12/2014 | Dolbakian | |
| 2016/0178383 A1* | 6/2016 | Mays | G01C 21/3682 701/408 |
| 2017/0359698 A1* | 12/2017 | Wirola | G01S 5/0252 |

OTHER PUBLICATIONS

International Search Report for PCT/IB2017/050590, dated Sep. 5, 2017.
Written Opinion of the International Search Authority for PCT/IB2017/050590, dated Sep. 5, 2017.

* cited by examiner

SYSTEM, DEVICE, AND METHOD OF NAVIGATION IN TRACKS

CROSS-REFERENCE TO RELATED APPLICATIONS

This patent application is a National Stage of PCT international application number PCT/IL2017/050590, having an international filing date of May 28, 2017, published as international publication number WO 2017/212472 A1, which is hereby incorporated by reference; which claims priority and benefit from United States provisional patent application number U.S. 62/345,870, filed on Jun. 6, 2016, which is hereby incorporated by reference.

FIELD

Some embodiments relate to the field of electronic devices and computerized systems for navigation.

BACKGROUND

Electronic devices are utilized for various purposes. For example, users often utilize smartphones, tablets, laptop computers, and other computing devices in order to browse the Internet, consume audio content and video content, play games, perform word processing tasks, send and receive electronic mail, engage in video conference and instant messaging, and perform other computerized tasks.

Many users utilize a smartphone in order to operate a navigation application, which may provide to the user a graphical image of a street map of a city, and may also provide to the user turn-by-turn directions for driving with a vehicle from a first location to a second location.

SUMMARY

Some embodiments of the present invention comprise devices, systems, and methods of navigation in tracks and trails, and of generating and providing navigation data to travelers, particularly in walking trails. The present invention further enables an administrator or operator of a venue (e.g., a Nature Center), to obtain real-time information about travelers within the venue, and to selectively provide data and messages to some or all of such travelers.

DETAILED DESCRIPTION OF SOME DEMONSTRATIVE EMBODIMENTS

The Applicants have realized that conventional navigation systems and mapping systems may operate adequately in an urban area having well-mapped and formally-defined streets and roads.

The Applicants have realized that conventional navigation systems and mapping systems often fail to adequately operate in non-urban areas, such as when the user attempts to hike or walk in a non-urban area from a first point to a second point, or a long a hiking trail that may not be formally defined or may not be well defined in conventional street-maps or driving-maps.

The Applicants have realized that conventional navigation systems and mapping systems often fail to address the particular interests, needs, and/or characteristics of a user who does not drive a car from Point A to Point B, but rather, walks or hikes or rides a bicycle among two or more points, or along one or more tracks in non-urban or non-mapped areas.

The present invention may comprise systems, devices, and methods to enable efficient mapping and/or navigation for users who walk, hike, run, ride a bicycle, or otherwise transport themselves in non-vehicular manner, from Point A (origin point or source point) to Point B (destination point or target source), or among multiple points or "trip legs", or along one or more trails or tracks, particularly in non-urban areas that are characterized by lack of streets, lack of vehicular roads, lack of street names, lack of road names or road numbers, and/or other characteristics of nature (e.g., within a forest, around a lake or body of water, across or along a river, within a desert or canyon, in valleys or mountains, or the like).

Although portions of the discussion herein may relate, for demonstrative purposes, to navigation or mapping in non-urban areas or rural areas or remote areas or nature-based areas, the present invention is not limited in this regard, and may be utilized in various other types of areas or regions or terrains, including, for example, in urban areas, in cities or towns, in suburbs, in areas that may have formally-named streets or roads but may not necessarily have formally-defined tracks or walking trails or hiking routes, and/or in other suitable areas or regions which may be urban and/or non-urban.

Figure 1:
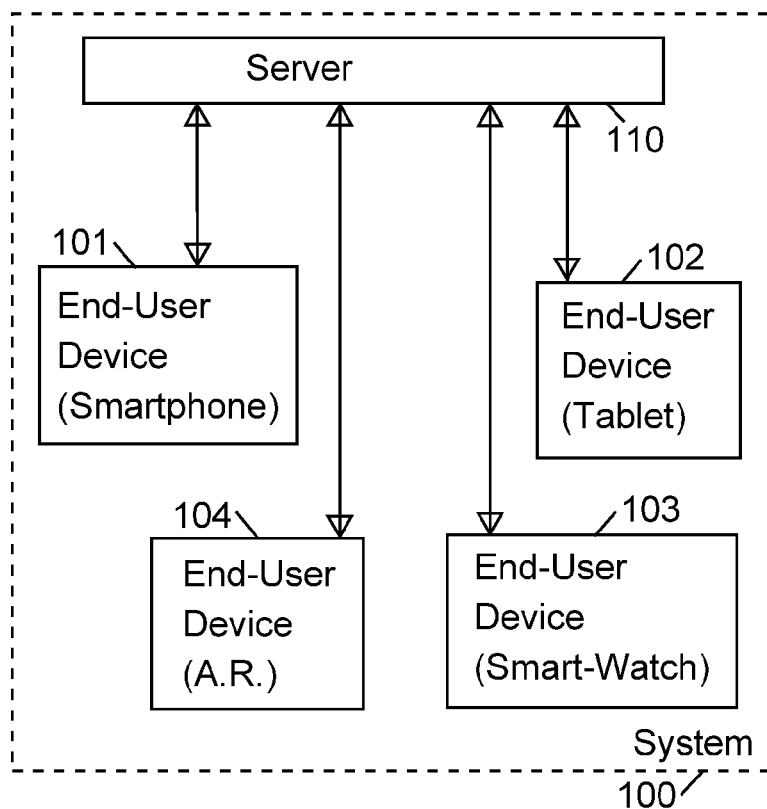
FIG. 1 is a schematic block-diagram illustration of a system, in accordance with some demonstrative embodiments of the present invention.

Reference is made to FIG. 1, which is a schematic block-diagram illustration of a system 100 in accordance with some demonstrative embodiments of the present invention. System 100 may comprise a server 110, able to communicate with one or more end-user devices 101-104.

Server 110 may be or may comprise a computer, a web server, an application server, a "cloud computing" server or device, or other suitable computing element or device. Server 110 may dynamically generate and/or serve and/or provide to end-user devices 101-104 mapping information, navigation information, navigation data, turn-by-turn directions, step-by-step directions, information about attractions or sightseeing, weather information, alerts and notifications, or the like. In some embodiments, some, or most, or all of the computations and/or data that are performed, may be stored and/or performed in such remote "cloud" server or repository; or, may be divided between a local device (e.g., end-user smartphone) and a remote server; or may be implemented using other architecture (e.g., peer-to-peer network; many-to-many communications, particularly among multiple travelers in the same venue).

End-user devices 101-104 may be or may comprise any suitable electronic device, typically a portable or a mobile device able to communicate with server 110 over one or more wireless communication links or channels or networks. For example, end-user device 101 may be a smartphone; end-user device 102 may be a tablet; end-user device 103 may be a smart-watch; end-user device 104 may be an Augmented Reality (AR) device (e.g., similar to Google Glass®, or other wearable device or helmet or glasses or head-set or head-gear). Other suitable end-user devices may be used, such as, a camera or imager or image-capturing device or video-capturing device (e.g., similar to .GoPro Hero devices), a drone or remote-controlled aircraft or miniature aircraft or other airborne device, or the like.

Figure 2:
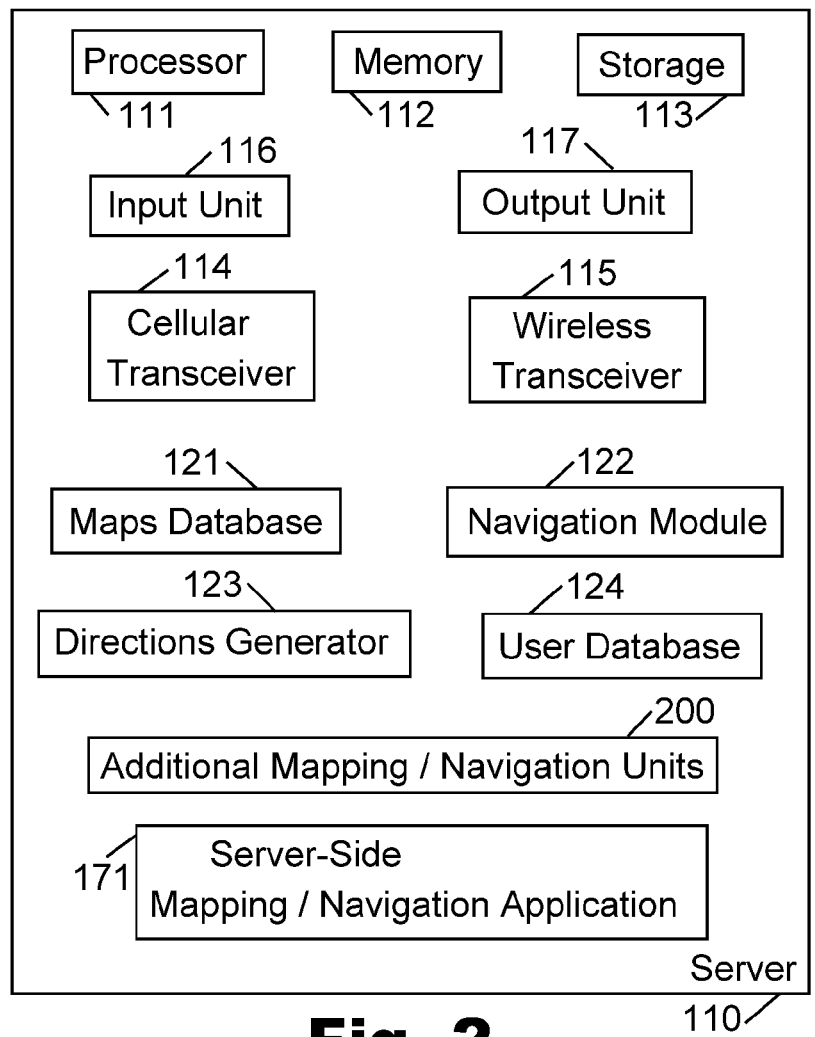
FIG. 2 is a schematic block-diagram illustration of server, in accordance with some demonstrative embodiments of the present invention.

Reference is made to FIG. 2, which is a schematic block-diagram illustration of server 110 in accordance with some demonstrative embodiments of the present invention. Server 110 may comprise, or may be associated with, for example: a processor 111; a memory unit 112; a storage unit 113; a cellular transceiver 114; a wireless communication transceiver 115 (e.g., Wi-Fi transceiver); an input unit 116 (e.g., keyboard, mouse, touch-pad); an output unit 117 (e.g., display, screen, monitor); and/or other suitable hardware units and/or software units.

Server 110 may further comprise, or may be associated with, for example: a maps database 121 storing map data; a navigation module 122 able to calculate and/or generate navigation data from Point A to Point B; a turn-by-turn directions generator 123 able to generate turn-by-turn directions for navigating from Point A to Point B; a user database 124 to store data of users (e.g., name, username, password) and/or current data of users (e.g., current location, current velocity) and/or historic data of users (e.g., previous locations, previous velocities); and a server-side mapping/navigation application 171.

Server 110 may be implemented, for example, by using multiple co-located servers or computers or database, or by using multiple servers or computers or databases that may be remote from each other, or distributed over multiple locations. Server 110 may optionally be implemented, for example, by utilizing: a search engine or Web spider or Web crawler; a database or storage unit; a batch server able to handle non-real-time CPU outbound operations; a process server able to handle real-time CPU outbound operations; a logistics server able to handle I/O bound operations; a mapping server or maps server (e.g., able to generate or handle tiles, vectors, raster layers); a maps gate server (e.g., proxy for maps and geographical information); a gate server (e.g., handling communications between all users and all other servers); a messaging server or "push" notifications server or unit; an application server; a Web server; a monetary operation server able to perform electronic monetary operations (e.g., collection, billing, charging) in some implementations that collect fees from users or from business users; a load balancing unit, switch, hub, or other routing or re-routing component or network element(s); and/or other suitable hardware units and/or software units.

Some embodiments may be implemented, for example, by utilizing one or more Application Servers, e.g., Client API server; a "Live" server that handles all live data or real-time data; a Media server that handle uploading and/or downloading of media; a Business client API server; a Synchronized processing server; an Asynchronized processing server, and a server or controller that controls it; a Movie Production server to produce a user-tailored and/or trip-tailored movie or audio/video clip or presentation; as well as local and/or remote database and/or storage units (e.g., PostgreSql, MongoDb, AWS S3); as well as Infrastructure Servers, e.g., a Map tile server, an Open Source Routing Machine (OSRM) server or other routing server; a querying data server or a querying Open StreetMap (OSM) data server; a GeoCoding server; a Central log server; and/or other suitable units.

Figure 3:
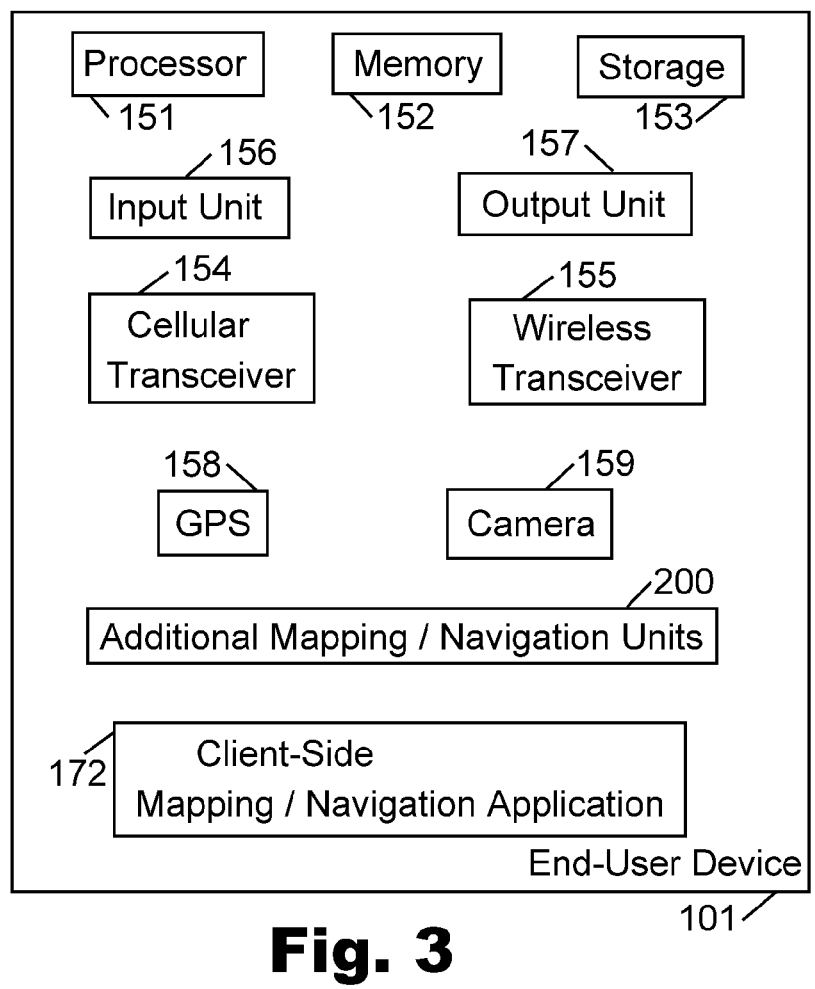
FIG. 3 is a schematic block-diagram illustration of an end-user device, in accordance with some demonstrative embodiments of the present invention.

Reference is made to FIG. 3, which is a schematic block-diagram illustration of end-user device 101 in accordance with some demonstrative embodiments of the present invention. End-user device 101 may comprise, for example: a processor 151 or CPU or DSP or other suitable controller; a memory unit 152; a storage unit 153; a cellular transceiver 154; a wireless communication transceiver 155 (e.g., Wi-Fi transceiver); an input unit 156 (e.g., a touch-screen, a microphone, an on-screen-keyboard, an on-screen keypad); an output unit 157 (e.g., display, screen, touch-screen, audio speakers); a Global Positioning System (GPS) receiver or unit or element 158 (or other suitable geo-location element or unit, or location-finding unit or element); a camera 159 or imager able to capture photographs and/or video clips; a client-side mapping/navigation application 172; and/or other suitable hardware units and/or software units. The end-user device 101 may comprise, and the system may utilize, other suitable hardware units and/or software modules; for example, one or more geo-location sensors, barometers, accelerometers, gyroscopes, device orientation sensors, device positioning sensors, temperature sensors, or the like.

In accordance with the present invention, end-user device 101, and/or server 110, may optionally comprise one or more Additional Mapping/Navigation Units 200, which may comprise one or more of the units or modules that are described herein; and which may be implemented as client-side features or units, as server-side features or units, or as hybrid client-server features or units which may operate by interaction(s) between server 110 and end-user device 101.

Figure 4:
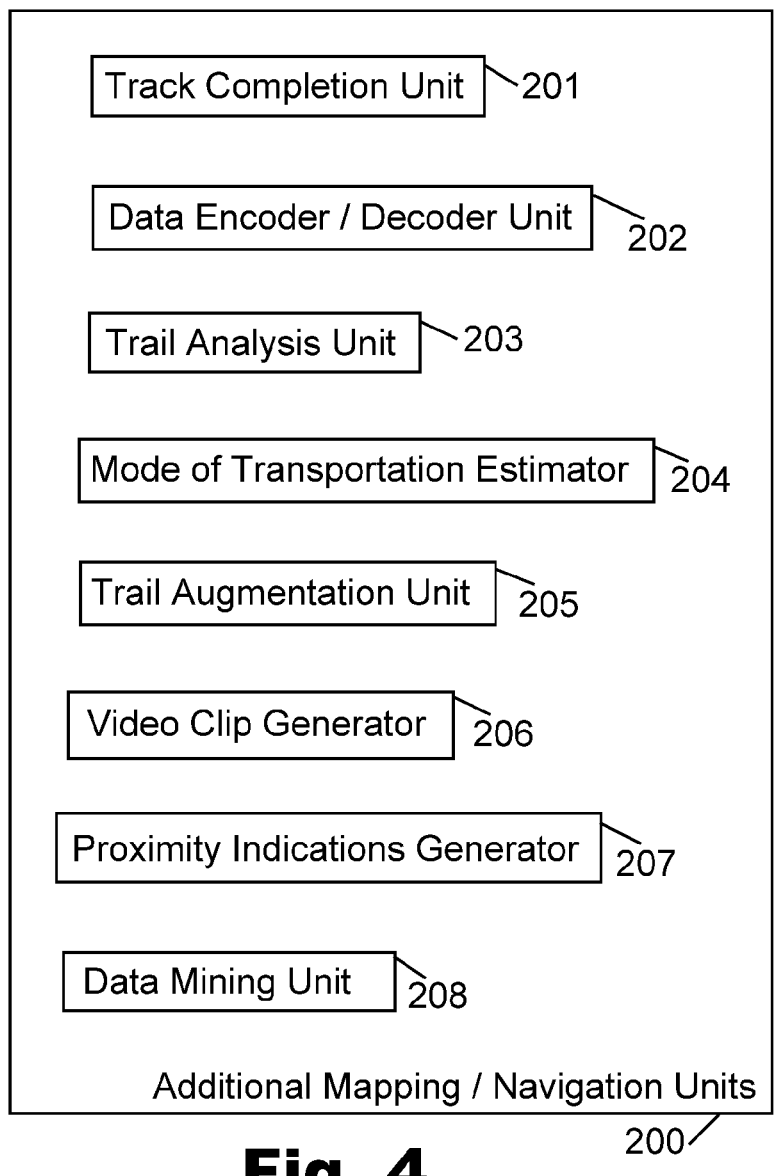
FIG. 4 is a schematic block-diagram illustration of Additional Mapping/Navigation Units, in accordance with some demonstrative embodiments of the present invention.

Reference is made to FIG. 4, which is a schematic block-diagram illustration of Additional Mapping/Navigation Units 200, in accordance with some demonstrative embodiments of the present invention.

Track Completion Unit 201 may include a unit or module able to analyze current user data and historic user data, of a particular end-user device, in order to determine or estimate or deduce therefrom, a route-segment or trip-segment or track-segment that is missing from an already-performed or partially-performed or currently-performed track or trip; and in order to generate a graphical representation or image or on-screen route that corresponds to such estimated missing segment. For example, user Adam may hike by foot from Point A to Point B within a dense forest, in which GPS reception may not exist or may be blocked or may be partially blocked. End-user device 101 of user Adam may have GPS reception at Point A, and may have GPS reception at point B, but may not have GPS reception at all between these points; or may have partial or temporary GPS reception at Point K in between.

A conventional mapping system, if requested to map the route that the user walked from Point A to Point B, may draw a straight line between Point A to Point B; or may draw a first line from Point A to point K, and a second line from Point K to Point B.

In contrast, the Track Completion Unit 201 may deduce or determine or estimate non-straight line(s), or curved line(s), or a set of lines or segments (e.g., a zig-zag shaped segment) that match the actual hiking route segment that user Adam has actually walked from Point A to Point B, even though there was no GPS reception and/or no other geo-location service for end-user device 101 of user Adam along that route (in whole or in part). For example, Track Completion Unit 201 may review current and/or historic location-based data of other users that moved or hiked from Point A to Point B, and which may have part or full GPS data associated with them (or with segments of such other trips). Track Completion Unit 201 may thus determine that the actual hiking trail that some or most or all hikers take, when they walk from Point A to Point B, is a semi-circle or a particular curve or trail. Accordingly, when user Adam requests from his end-user device to display a map of his currently-walked trip-segment or his previously-walked trip-segment from Point A to Point B, the Track Completion Unit 201 may determine and may display that semi-circle or curved trail that was walked or was indicated by other users that traveled from Point A to Point B, even though the end-user device 101 and/or the server 110 do not actually know the actual GPS locations that user Adam has actually walked, due to lack of GPS reception and/or partial GPS reception (or lack of other geo-location data) that end-user device 101 suffered from while being on that trip-segment.

The above method may be implemented on multiple trip-segments, with fine resolution based on actual points in which the end-user device 101 did have GPS reception along that route. For example, if along the walking trip from Point A to Point B, the end-user device had GPS reception at Points A and B as well as at points K and L along the way, then the above method may be implemented to estimate: a curved or non-linear actual trail walked from Point A to Point K; then, a curved or non-linear actual trail walked from Point K to Point L; then, a curved or non-linear actual trail walked from Point L to Point B.

In some embodiments, the Track Completion Unit 201 may take into account one or more user-specific data in order to estimate the missing trip segment, or in order to select among two or more possible estimated trip segments from Point A to Point B. For example, Track Completion Unit 201 may determine, based on map analysis and/or based on hiking history of other hikers, that users may walk from Point A to Point B, either via the Yellow Trail which is semi-circle and extends for 2 kilometers; or via the Red Trail which is a zigzag line that extends for 5 kilometers. Track Completion Unit 201 may then analyze characteristics of the movement of user Adam, prior to his walking from Point A to Point B, or subsequent to his walking from Point A to Point B; and may determine that user Adam typically walks at a speed of approximately 2.1 kilometers per hour. Track Completion Unit 201 may further determine that user Adam took 58 minutes to move from Point A to Point B. Based on multiplication of velocity by time, to result in distance traveled, Track Completion Unit 201 may determine that, most probably, due to the time that elapsed and the typical speed of user Adam, he took the Yellow Track and not the Red Trail; and Track Completion Unit 201 may accordingly show to user Adam a completed trip-segment that corresponds to the semi-circular Yellow Trail, and not to the zigzag Red Trail.

In some embodiments, Track Completion Unit 201 may also take into account, in order to determine the estimate trail or trip-segment that was actually walked or used by user Adam, other suitable information; for example, analysis of historical trails that user Adam had walked in the past (e.g., identifying that user Adam always prefers to take the Longer route among two possible routes, and not the shortest routes; or identifying that user Adam typically prefers to take a trail that follows a river or a body-of-water and not an in-land trail). Optionally, Track Completion Unit 201 may perform and/or may take into account a contextual analysis of messages that user Adam sent before or after or during his trip (e.g., "I am excited to go on the Yellow Trail soon!"), or that user Adam received before or after or during his trip (e.g., "Adam, did you finish walking the Yellow Trail?"), and/or other contextual analysis that user Adam performed via his end-user device 101 (e.g., taking into account that user Adam searched on his smartphone "length of Yellow Trail", and did not search on his smartphone for "Red Trail"). Other suitable data may be used by Track Completion Unit 201.

Data Encoder/Decoder Unit 202 may run on end-user device 101 and/or on server 110, and may enable efficient and/or low-band and/or reduced bandwidth wireless communication, as well as reduced-power wireless communication.

The Applicants have realized that end-user devices typically transmit to remote servers, continuously and/or at very short time intervals (e.g., every second), a full set of complete data-items; and the wireless transmission of such full and complete data items consumes significant amount of power, which is typically limited in a portable end-user device, and which may not be readily replenished or recharged when the user is hiking or traveling in remote locations. Accordingly, the Applicants have realized that it may be beneficial and important to preserve battery power; and that this may be achieved by encoding or compressing or cropping or otherwise modifying one or more data-items that are transmitted by the end-user device 101 to server 110, and or that are received wireless in the opposite direction (received by end-user device 101 from server 110).

The Applicants have further realized that the transmission, reception, handling, and/or storing of full and complete data-items with regard to user location and user characteristics (e.g., velocity), may entail privacy risks, privacy concern, security risks, security concerns, data storage burdens, and/or other problems or disadvantages.

For example, Data Encoder/Decoder Unit 202 may initially send (or receive) a full longitude data-item (e.g., "35.2519641") and/or a full latitude data-item (e.g., "−112.1890153"). Then, at pre-defined time intervals (e.g., every second, every 5 seconds, every 10 or 30 seconds, every minute, every N seconds or minutes, or the like), the Data Encoder/Decoder Unit 202 may send (or may receive): (a) only the least-significant digits of each data-item (e.g., the K right-most digits), or a cropped or concatenated version of the data-item; and/or (b) a difference or "delta potion" or offset, between the most-recent location and the current location. This may enable the Data Encoder/Decoder Unit 202 to send (or receive) by utilizing less bandwidth and/or less packets and/or less time and/or while consuming less transmission power and/or while consuming less reception power. On the other side, such as at server 110, a similar Data Encoder/Decoder Unit 202 may utilize the received data, and based on previously-received data it may reconstruct or calculate the full data-item of the current location.

Similar concatenation of data, or sending of offset or differences only, may be performed with regard to other data that is sent and/or received; for example, with regard to altitude data, velocity data (speed value, speed direction), time data, date data, time-and-date data, acceleration data, deceleration data, and/or other suitable data. In some embodiments, a space-saving controller module may selectively activate and de-activate the process of shortening or truncating or encoding data-items or location-based data-items or GPS data-items; based on one or more parameters which may be hard-coded or may be pre-configured or may be dynamically modified or may be otherwise triggered by occurring conditions; for example, such data truncation or encoding may commence if, or may be performed as long as, the power level of the end-user device is below a threshold value (e.g., below K percent of full capacity, wherein K is, for example, 50 or 40 or 33 or 25 or 15), and/or only if the system determines or estimates that the end-user is travelling by a particular transportation mode (e.g., walking by foot; and not driving by car), or the like. In some embodiments, once per N seconds (e.g., once per 60 or 120 seconds), or at pre-defined time intervals, the end-user device sends non-truncated or non-encoded or non-shortened location-based data, in order to ensure that at least once per N seconds the remote server receives full location-based data and re-calibrates its offset point or its baseline point for receiving further encoded data.

The space-saving data may be transmitted to and/or received from server 110, or may be transmitted to and/or received from end-user device 101. The space-saving data may be stored locally in a shortened space-saving format within end-user device 101 (e.g., to save local storage space, which may be limited in a portable device) and/or within server 110 (e.g., to save on storage space, since server 110 may need to store historic data regarding millions of users).

In some embodiments, a lookup-table or other pre-defined legend may be utilized, in order to indicate by one device to another device (e.g., by end-user device 101 to server 110, or by server 110 to end-user device 101), which space-saving method is utilized, or which data-replacement method is utilized, or which data reconstruction method should be used by the other device in order to reconstruct full data items; or which level of resolution or granularity is utilized for certain data-items (e.g., to indicate level of accuracy of GPS data).

The space-saving format and data-exchange method, may further enable increased privacy and/or increased security for users of the present invention. For example, an attacker that eavesdrops on some communications, may only obtain from them the "offset" distance of the user from his previous location, and may not be able to determine the actual location of that user merely based on such offset, without also knowing or obtaining the original full data-item that such offset or "delta" value relates to.

Trail Analysis Unit 203 may perform analysis of data pertaining to trip data, in order to determine the route segment that was actually walked or traveled by a particular user or by a group of users (e.g., non-related to each other, at different times), and/or in order to determine or deduce or estimate an existence of a trail in real-life at certain geo-locations. For example, trip data of multiple users may be converted into mathematical representations and/or equations and/or polynomials and/or formulae, which may then be researched or analyzed via mathematical and/or probabilistic and/or statistical methods by the Trail Analysis Unit 203 in order to reach such determinations or estimations, and/or in order to determine junctions, intersections, curvature of trip segments or routes or trails, determining that two relatively-close or relatively-proximate trip segments of user Adam and user Bob are actually a single, unified, trail in real life. For example, user Adam may walk from on the right shoulder of the Yellow Trail; user Bob may walk on the left shoulder of the Yellow Trail, which may be 3 or 4 meters away, and generally parallel to, the right shoulder; and the Trail Analysis Unit 203 may determine, that even though user Adam walked on two slightly-different paths, based on their proximity to each other, and based on their being parallel to each other along some or most segments, the two paths that were walked by Adam and Bob are actually a single, unified, trail that is common to both of these users, and should be mapped or deduced as a single unified or merged or fused trail or track, and not as two different trails. This may enable the system to generate a single, unified, walking trail, which may reflect dozens or even hundreds of slightly-varying real-life walking trails. In some embodiments, the system may be able to detect and to discard a Trail Deviation that is not part of the unified trail; for example, 9 different travelers may walk separately along the Red Trail, generally following the same trail; but one of them may deviate from the trail for a limited period of time (e.g., for less than M seconds, wherein M is for example 10 or 30 or 60 seconds, or other threshold value), for example, in order to drink water from a water machine or in order to take a photograph of a rare bird; the system may analyze the location-based data, and may detect that this deviation is a minimal deviation of a particular traveler which does not reflect the actual trail (or route) that is being mapped, and that the actual trail or route should not reflect that minor walking deviation; thereby generating a correct trail without said deviation, and thereby preventing a possible misleading of other walkers if they rely on a walking trail that includes such undesired deviation from the trail.

In some embodiments, the Trail Analysis Unit 203 may analyze the sensed data and may further utilize user-specific information that is known about the specific user, based on user-provided information (e.g., the user indicating in her profile that the user is disabled; or the user indicating in his profile that the user is an Extreme Sports enthusiastic), in order to determine or estimate which trail or route was actually taken by that specific user in order to move from Point A to Point B. For example, user Adam may indicate in his profile, that user Adam is disabled or that user Adam requires wheelchair accommodation; the Trail Analysis Unit 203 may determine that user Adam has moved from being at the Waterfall (at time 2:27 pm) to being at the Cliff (at time 2:45 pm); the Trail Analysis Unit 203 may further determine that there are two possible trails or routes that connect the Waterfall with the Cliff: the Red trail which is difficult and challenging and typically cannot be used by disabled persons, or the Yellow trail which is easier and is disabled-friendly; and based on the determination that user Adam is disabled (e.g., as defined or indicated in the user profile), the Trail Analysis Unit 203 may thus determine that user Adam actually took the Yellow trail and not the Red trail; and this may further be reflected in the Trail Map that is generated for that trip, or for the movie clip that is generated for that trip.

Additionally or alternatively, the system may be able to perform such determination, even if user Adam did not explicitly indicate in his profile that user Adam is disabled; but rather, based on autonomous analysis of historical data pertaining to previous trips and trails that user Adam had taken. For example, the system may analyze such historical data and may detect that in at least K percent of the previous trips of user Adam (e.g., where K is, for example, 50 or 51 or 75 or other pre-configured threshold value), user Adam had taken a disabled-friendly route and not an Extreme Sports route; and/or the system may determine that in the past, whenever there was a choice between a difficult trail and an easy trail, user Adam had selected to take the easier trail; and based on such determination, the system may deduce or determine that also in the presently-analyzed trip or trail, user Adam took the disabled-friendly trail and not the Extreme Sports trail Similarly, user Bob may be an Extreme Sports fan, and may indicate such information in his user profile; thereby enabling the system to determine, for a particular trip in which it is unknown whether user Bob took a difficult trail or an easy trail, that user Bob took the difficult trail based on such user-specific indication in the user profile, and/or based on analysis of prior trips of user Bob that indicate that user Bob had always selected the more-difficult trail when such choice was available to him in prior trips at other locations.

The system may comprise a Trail Characteristic Estimator unit or module, to deduce or to estimate one or more features of a particular trail or route, based on one or more current or historical features or a user (or a set of users) that hiked or traveled or visited that trail or route. For example, the Trail Characteristic Estimator may analyze the location-based data of users, and may notice that user Adam visited the Purple Trail; and may further determine that user Adam had visited in the past only trails that are disabled-friendly (e.g., trails that are accommodating for disabled persons), or may detect that user Adam had mentioned in his user profile that he is disabled, or that he is interested in disabled-friendly trips or routes or trails. Based on this information about the hiker Adam, the Trail Characteristic Estimator may determine that the Purple Trail that was recently (or currently) hiked by Adam, or that a new, previously-unknown (or even un-named) trail currently or recently visited by Adam, is most-probably a disabled-friendly trail or route; and the system may utilize a Tagging Module to tag that particular trail or route as Disabled Friendly, based on the hike of user Adam in that route. Similarly, the tagging may be based on data collected from a group of users; for example, indicating that several disabled users have visited the Pink Trail, thereby enabling the Trail Characteristic Estimator to determine that the Pink Trail is accommodating for disabled persons, and enabling the Tagging Module to tag the Pink Trail as a Disabled-Friendly trail. The system may further enable to user Carl, to search or to filter only for trails or routes that were already defined or tagged by the system as Disabled Friendly, thereby allowing other users of the system to benefit from such deduction of insights. The utilization of "disabled friendly" tagging is demonstrated only as a non-limiting example; and the Trail Characteristic Estimator may estimate or deduce or determine other characteristics or tags for a particular route or trail, based on characteristics or features of the user(s) that traveled or that currently travel that particular route or trail; for example, children-friendly trail, family-oriented trail, senior citizens friendly trail, bicycle friendly trail, Extreme Sports fans trail, or the like.

The system may further comprise a Visitor Characteristic Estimator unit or module, able to estimate or deduce or determine one or more user-specific characteristics, based on the routes or trails or trips that were performed or taken by that user. For example, the Visitor Characteristic Estimator may analyze the geo-location data of the routes that were recently hiked or traveled by user David; and may detect that most, or all, of the trips or routes that were taken by user David in year 2016, or in the past 90 days, are defined in the system as disabled-friendly trails; and may thus determine that user David is disabled, or is accompanying a disabled person. Similarly, the system may determine that all or most of the venue attractions that were visited by user Janet, within the last 6 months, are child-oriented attractions in the venue (e.g., the Kids Playground); and may thus determine or estimate that user Janet is accompanied by one or more children during her trips. These determinations may be used to tag a particular user with one or more such characteristics (e.g., disabled; has children; fan of Extreme Sports trails; or the like); and may then be used by the system for one or more purposes; for example, in order to selectively send messages or alerts only to such subset of users that have that characteristic (e.g., sending the message "Our magician will perform near the Waterfall in 20 minutes" to all visitors that were tagged by the system as "children oriented" visitors); or in order to selectively provide to such particular subset of visitors, a particular promotion or coupon or offer or advertisement (e.g., sending only to such users that were tagged as "children oriented", an advertisement message that "our cafeteria is serving a Kids Meal"), or the like. These insights may further be used subsequently, for marketing purposes and for advertisement targeting purposes, when such users are off-the-venue and are away from the venue.

Mode of Transportation Estimator 204 may estimate or determine or deduce a current or recent or previous mode of transportation of one or more users; such as, whether a user utilized a car or motorcycle, or walked or hiked, or utilized bicycle, or utilized other means (e.g., a boat). For example, Mode of Transportation Estimator 204 may take into account: (a) speed or velocity of transportation, which may indicate a rapid means (e.g., a car driving at 70 kilometers per hour) and not a walking user and not a bicycle riding user; (b) whether the terrain is suitable for certain modes of transportation (e.g., determining that the terrain is a forest, and therefore the means cannot be a car; determining that the terrain is a lake, and therefore the means is a boat or a swimming user, and then differentiating between them based on speed); (c) the acceleration of the user, which may indicate a mode of transportation; (d) the change in acceleration of the user, which may also indicate a mode of transportation, or an abrupt stop, or a gradual stop, or an abrupt commencement of movement, or a gradual commencement of movement; (e) means of transportation that were already identified or indicated by the same user, at previous trips and/or during the same trip; (f) means of transportation that were already identified or indicated by other users, at previous trips and/or during the same trip or the same area; (g) contextual analysis of messages that the user sends and/or receives (e.g., "I am riding my bike now on the Yellow Trail", or "Let's walk on the Red Trail"), including contextual analysis of text in such messages, and/or image analysis and/or computer vision analysis of one or more photos or videos that were captured and/or sent by the user (e.g., a user taking a "selfie" image of himself, wearing a bicycle helmet and/or standing next to his bicycle); (h) probabilistic analysis and estimation of whether or not a user, who is currently observed as travelling at walking speed, is indeed walking or is still driving at low speed; (i) weather conditions, which may be more favorable or less favorable to a particular means of transportation (e.g., rain may be less favorable for bicycle riding, but may still be favorable for hiking at certain places); (j) data or insights obtained or deduced by utilizing a Machine Learning algorithm or system; and/or other suitable data; (k) audio data sensed and/or collected via one or more microphones sensors of the end-user device, for example, the microphone of the end-user device is activated and captures audio and surrounding sounds and ambience, and an audio analysis unit (e.g., locally within the end-user device, or remotely in a remote server) analyzes such captured audio or at least a sample of such captured audio, and determines that the user is travelling by car (e.g., by identifying audio sound or noise that corresponds to noise of a motor vehicle) or by bicycle (e.g., by identifying audio sound or noise that corresponds to bicycle wheels turning or spinning) or by foot (e.g., by identifying audio sounds that correspond to tapping of feet along a terrain), or the like; (L) accelerometer data and/or gyroscope data and/or vibration data and/or device-orientation data, that are captured or sensed by the end-user device, and that are analyzed locally and/or remotely, and enable the system to sense a first type of vibrations or displacements that are typical when (or that are more common when) the user travels by vehicle, or alternately by identifying a second type of device-vibrations or displacements that are typical when the user travels by bicycle (e.g., due to the cyclical movement of pedaling feet), or alternately by identifying a third type of device-vibrations or displacement that are typical when the user travels by foot (e.g., due to exchange of right-foot left-foot while walking, and particularly when the end-user device is stored in a pocket of the pants of the user), or the like.

In some embodiments, optionally, the above-mentioned information may even enable the system to estimate or to determine which make and/or model is a particular vehicle that the user is utilizing; for example, based on analysis of captured audio, device vibrations and/or device displacement, as well as geo-spatial information and acceleration, the system may firstly determine that the user is moving at a speed of 65 miles per hour, and therefore the system determines that the user is utilizing a vehicle and not a bicycle and is not walking; then, based on analysis of captured audio, device vibrations and/or device displacement, the system may determine or may estimate that the vehicle is a Tesla electric car (e.g., due to extremely low motor noise, or due to lack of motor noise, or due to identification of a particular motor noise signature that characterizes Tesla cars), or that the vehicle is a Ford Mustang (e.g., due to a particular throttle sound or throttle noise signature).

In some embodiments, the above-mention determination(s) may be performed by a two-tier or multiple-tier process. For example, in a first tier, the system may utilize a set of pre-defined parameters and sensed data-items (e., geo-spatial location; speed; acceleration; displacement; displacement over time; identification of full stops; or the like), in order to make a preliminary determination about the mode of transportation. The first tier of the analysis may be configured to yield exactly one of two possible outputs, for example: (i) a certain determination that the user is travelling by vehicle (e.g., due to identification of current speed and/or average speed of 68 miles per hour); or, (ii) a determination that the set of parameters does not enable the system to determine in confidence which mode of transportation is utilized (e.g., due to identification that the speed and acceleration of the user may correspond to a fast runner and to a bicycle rider and to a slow-driving car). In some embodiments, the first tier of analysis may yield other types of determinations; for example, a determination that the user is certainly not walking and not running, together with a determination that it is uncertain yet whether the user is utilizing a car or a bicycle.

Then, if the system did not yet determine for certain, in the first tier of the analysis, which mode of transportation is used by the user, the system may proceed to perform a second tier of analysis which may utilize further calculations and/or may be based upon other data. In some embodiments, for example, the second tier of the process may activate the accelerometer and/or the gyroscope(s) of the end-user device, for a pre-defined time period (e.g., 3 seconds, 5 seconds, or the like), and may sample the sensed data based on a pre-defined sampling rate (e.g., 5 or 20 or 50 times per second); the sensed data is converted or divided or separated into three perpendicular axis data, for example, X-axis data, Y-axis data, and Z-axis data; then, the data for each axis undergoes a mathematical transformation process (e.g., undergoes Fast Fourier Transform (FFT) or other suitable transformation), yielding three graphs or functions or outputs having different shapes or structures; the three outputted graphs or functions or data, are filtered through three, respective, filters which output, for each one of the three graphs, a confidence score regarding the most-probably mode of transportation for that graph (e.g., most-probably a car, or most-probably a bicycle, or most-probably a walker/runner by foot); then, the system may utilize a pre-defined determination process to reach a final decision based on the three confidence scores (e.g., if all three confidence score agree with each other than their output is indeed the determined mode of transportation; or, if two out of the three confidence scores agree with each other than the system determines that the mode of transportation agreed by the two of the three confidence scores is the correct one; or the like).

Optionally, the results of the second tier may be weighted or may be taken into consideration by using a pre-defined weighting formula or weight factors (e.g., which may allocate a greater weight or an increased weight to the Z axis; or, which may allocate a greater weight or an increase weight to the X and Y axis data and not to the Z axis; or the like). Optionally, the results of the second tier of the analysis, are also compared to the results or the output of the first tier of the analysis, in order to detect an abnormal result or an anomaly (e.g., if the second tier yields three outputs that indicate "walker by foot" at high confidence, but the first tier indicates an average velocity of 62 miles per hour which does not characterize a walker or a runner). In some embodiments, the parameters that are utilized in the second tier of the determination process, may be obtained by using a neural network, or the second tier itself may be implemented as a neural network, thereby allowing the system to autonomously self-learn and to improve and/or auto-correct the parameters over time.

In some embodiments, the estimated or determined means of transportation, may further be utilized in order to adjust or modify the rate at which the end-user device 101 sends and/or receives data; such as, decreasing the time-interval between transmissions if it is determined that the user is driving a car, or increasing the time-interval between transmission if it is determined that the user is walking. This may enable the system to provide efficient utilization of power consumption to end-user device 101.

Trail Augmentation Unit 205 may operate to augment the information related to a trip or track or trail or route-segment, that a user has traveled or is travelling or plans to travels or is considering to travel. For example, Trail Augmentation Unit 205 may analyze data from one or more external sources (e.g., a list or map or lookup-table or database of water coolers, or of public restrooms, or of cafeterias), in order to determine that a particular trail or track or route has (or does not have) two water-coolers along the route, and/or has one restroom facility along the route, and/or has picnic facility and/or camping area and/or sightseeing area and/or other objects of interest (e.g., monuments, archeological artifacts, or the like). Trail Augmentation Unit 205 may further collect or determine data that otherwise augments the trail data, for example, may determine that parts of the trail are covered (e.g., within a dense forest) and thus may be more suitable for hiking in rain or on a sunny day; or that parts of a trail are uncovered and thus may be more suitable for a user that has umbrella or hat).

Trail Augmentation Unit 205 may also collect data from Internet resources and websites, in order to determine that the Yellow Trail has a water fountain whereas the Red Trail does not, or that a certain trail has a restroom facility; and may augment the mapping system with such additional information, which may then be utilized by the user when selecting or requesting a trail for hiking. Accordingly, the Trail Augmentation Unit 205 may respond to user queries, that request to display or to choose a trip segment or route or track that includes (or excludes) water coolers or water fountains, or restroom facilities or camping grounds, or other points-of-interests or objects-of-interest.

It is noted that the Trail Augmentation Unit 205 may operate also in real-time, while the user is actually hiking or traveling or walking, by dynamically and pro-actively alerting the user via a pop-up notification or other pushed notification, that a point-of-interest or particular monument or object is located on the trail, or even located off the trail (e.g., "if you go 30 meters eastbound, off the trail, you will see the Waterfall"). The Trail Augmentation Unit 205 may thus advise the user during the trip or the hike, with regard to possible modification of the track or trip, in order to expose the user to such additional points-of-interest. The Trail Augmentation Unit 205, as well as other components of the system, may be learning components which may utilize Machine Learning, to gradually learn the preferences of a particular user or of multiple users; and may identify (and may then take into account) that a particular user prefers to take a longer route, or prefers to take a route that passes near water fountains or near bodies-of-water, or typically requires to stop at a restroom facility, or other trip characteristics and/or user characteristics that the system may then utilize in making further recommendations or suggestions, in the same trip and/or in future trip, of the same user and/or of other users that are located nearby.

Video Clip Generator 206 may automatically generate a video clip, or audio-video clip, or animation clip, which corresponds to and/or describes a trip that the user performed; and which may automatically include therein one or more photographs or images that the user captured via the end-user device 101 along the trip, and/or one or more map images or map-portions that indicate at which points each image or video-clip-segment was captured.

For example, user Adam may travel with his end-user device 101 from Point A to Point B, by foot along the Yellow Trail. User Adam may capture images and/or sounds and/or videos, at points C and D along the trail, and optionally also at points A and B. User Adam may stop for drinking water at water fountain located at Point E along the trail. User Adam may have partial GPS reception, or may not have GPS reception at all, along the trail.

Accordingly, the Video Clip Generator 206 may analyze the data characterizing the end-user device (its location, velocity, altitude, or the like), and may automatically compose or generate a video-clip or animation, which may comprise, for example: (a) an image or clip of a map which shows the entire trail; (b) then, an image or clip that indicate that the user is located at the beginning point of the trail; (c) then, a transfer or shift to an image of Point A, such as an image that the user captured, or an image obtained (e.g., from the Internet or site) which is associated with Point A; (d) then, depicting of the map of the trail, showing a progress indicator from Point A to Point C (e.g., a flag or a pin, or an avatar or image of the user, progressing along the map of the trail); (e) then, the image that the user captured at point C; (f) then, progress of the trail map from point C to point E, and showing of a water fountain image, with an automated caption or title "I had a Water Break here"; and so forth, with brief video-segments and/or audio-segments and/or animation-segments that correspond to segments of the real-life trip, as experienced by the user Adam via his end-user device, including in that video images and/or videos and/or audio that the user captured intentionally, and/or including also images and/or video and/or audio that the end-user device captured autonomously (e.g., if the end-user device is an Augmented Reality (AR) glasses or headset or gear that autonomously records and/or continuously records data, or a camera or device such as GoPro Hero device, or a drone or remote-controlled aircraft or airborne device), and/or images or clips of monuments or points-of-interest that are located along the identified route that was walked or traveled (e.g., optionally including images or video-segments that may be obtained from third parties, from the Internet, from other users, from previous trips of the user). The system may enable the user to save the automatically-generated clip, to edit or modify it, to share it or send it to recipients, to post it to social networking sites or blogging sites or file-sharing sites or other content-sharing platform, or to otherwise publish it via content-publishing platforms.

It is noted that the above description of the demonstrative process of video-clip generation, is provided only as a non-limiting example of a possible process that may be implemented by the Video Clip Generator 206; and other suitable processes may be utilized, in accordance with the present invention; and other suitable operations may be included in the process, or omitted, or repeated, or modified, or performed in different order or sequence.

In some embodiments, optionally, the Video Clip Generator 206 may utilize a suitable template for generating the video clip, based on a user selection, or based on an automatic or autonomous determination by the Video Clip Generator 206 with regard to which template would be most suitable for a particular trip. For example, the Video Clip Generator 206 may ask the user to select a template from a list of available templates (e.g., "forest walk" template, or "bicycle ride" template, or "fishing trip" template, or the like). Additionally or alternatively, the Video Clip Generator 206 may autonomously determine, and suggest to the user, a suitable template for generating the video-clip; such as, if the Video Clip Generator 206 determines automatically that the trip took place in a dense forest, and that the trip took place by walking (and not by riding a bicycle), then the Video Clip Generator 206 may automatically suggest and/or select the template of "forest walk" for generating that video-clip. Similarly, background image(s), sound effects, audio track, and/or other clip-specific features, may be selected or determined in order to accommodate a particular trip. In some embodiments, the template or theme of the video clip may be autonomously selected by the system; for example, based on contextual analysis of messages that the user sent while he was on the trail (e.g., the user sent out a message "I am now on the Red Trail in Springfield Forest"), and/or based on image analysis or video analysis or computer vision analysis of images or videos that the user captured and/or sent while he was on the trail or when he described the trail (e.g., detecting that in such image, there is a road-sign of "Welcome to the Springfield Nature Center"), and/or based on the time-of-day of the trip (e.g., automatically selecting a night-themed template for a trip that took place in the evening), or the like.

In some implementations, for example, images or background images, as well as other features of the clip (e.g., sound effects, background music, audio effects, animations, transitions) may be selected or determined or modified, by taking into account the characteristics of the trip and/or the trail and/or the user. For example, if the user is female, a pink or purple graphical theme may be selected. For example, if the trip occurred at night time or at sunset, then night-related or sunset-related imagery (and/or sounds) may be selected and/or inserted by the Video Clip Generator 206. For example, if the Video Clip Generator 206 identifies that the trip has passed through or near a waterfall location, then a sound effect of running water may be automatically added or inserted at the suitable segment of the video clip. Other suitable effects or selections may be inserted or performed by the Video Clip Generator 206, based on other suitable conditions or parameters.

In some embodiments, Video Clip Generator 206 may enable multiple users (e.g., a group of users that travel together, each user having his own end-user device) to contribute materials and/or data in order to collectively generate a unified video-clip describing their trip together. For example, each user of the group may join an online trip-group, or may otherwise indicate his consent to share information or materials or data. Then, Video Clip Generator 206 may obtain some trip data and/or images from a first user, and Video Clip Generator 206 may obtain other, additional, trip data and/or images from a second user; and Video Clip Generator 206 may generate a unified video clip pertaining to that trip, which incorporates therein the materials and data obtained from these two (or more) users, incorporated together into a single video clip that each group member may then receive, play-back, view and/or share.

Proximity Indications Generator 207 may operate to direct a user, who operates the end-user device 101, towards a particular point that is located in general proximity to the user yet may be difficult to find for a person in real-life situations; such as, to a monument or artifact that is difficult to see or to find, or to a beginning of a nature trail. For example, a conventional mapping application may guide the user, at most, to arrive at the parking lot of a nature center; but may not guide the user how to get from the parking lot to the beginning of the Yellow Trail that the user would like to hike. The Proximity Indications Generator 207 of the present invention may guide the user towards that particular point. The user may indicate to the end-user device that the user intends to perform a hike at the nearby nature center or attraction, or that the user is particularly interested in hiking along the Yellow Trail. The Proximity Indications Generator 207 may indicate to the user the general direction to which the user should walk. As the user moves, the Proximity Indications Generator 207 may track the relative movement or the new location of the user, and may indicate to the user whether the user is going Towards the desired point or Away from it; such as, by indicating to the user, "you are getting Warm" (or "warmer" or "hot") as the user approaches the desired location; or by indicating to the user "you are getting Cold" (or "colder") as the user's movement is actually taking him away from the desired point. In some embodiments, every N seconds (e.g., N being for example 0.5 seconds or 1 second or 2 second or 5 seconds or other threshold value), the end-user device may check whether the current location of the user is closer to, or is further from, the destination point, relative to its proximity N seconds ago; and may generate the "warmer/hot/hotter" indication, or conversely the "cold/colder" indication accordingly. For example, if the system detects that the user is located 185 meters away from the destination point, and after 5 seconds the user is located 189 meters away from the destination point, then the system may generate a "colder" alert or an indication of "you are walking away from the destination".

In some embodiments, the Proximity Indications Generator 207 may take into account additional parameters or data, and not only the linear distance between the current location of the user and the point-of-interest. For example, the Proximity Indications Generator 207 may determine that the user is actually walking correctly towards the point-of-interest, through a curved non-linear trail, which appears as if the user is walking away from the target point, but actually is indeed estimated to correctly bring the user to the desired target point of the user proceeds on his current trail. Optionally, the Proximity Indications Generator 207 may display a compass indication or a normalized compass representation, in order to similarly guide the user precisely towards the point-of-interest.

In some embodiments, an entity that manages or oversees a particular geographic location or area, may utilize the present invention in order to collect and extract data regarding users that navigate or hike at such location or area, and in order to automatically generate insights and/or notification alerts regarding users and/or their behavior, as well as drawbacks and/or advantages of the location or area.

For example, a website of Springfield Nature Center may offer to users to download or install a dedicated "app" or mobile application (or, to launch such application through a web-browser, such as an HTML5 with CSS and JavaScript application), or to access a particular page or tab or section in an "app" or mobile application. Once installed, the application may check the actual geo-location of the user. If the user is located at least K meters away from a particular point of the Springfield Nature Center, then the user may be regarded as "off the grid" and may not receive notifications or information from the system; and may not be regarded as a user that needs to be tracked within the Nature Center limits. In contrast, a user that is located within at least K meters from that particular point of the Nature Center, and/or a user that is located within a pre-defined polygon that defines borders of an area-of-interest that the administrator had defined, may be regarded as an actively-hiking user whose data may be collected and that may receive real-time notifications from the Nature Center administrator.

The application may thus enable the Nature Center to collect data regarding the actively-hiking users, their location, their velocity, the time that they spend at various regions or areas within the Nature Center, and/or other data. The application may further perform data analysis, taking into account time and/or date and/or spatial parameters and/or temporal parameters, in order to autonomously extract insights with regard to an entire group or populations of users that hike or travel in that Nature Center.

For example, a Data Mining Unit 208 may perform the following operations: (a) may determine the current real-time number of users that are currently hiking within the Nature Center (e.g., "176 users are currently within the Nature Center limits"); (b) may determine the current real-time number of users that are currently hiking at a particular Trail within the Nature Center (e.g., "38 users are currently hiking along the Red Trail"); (c) may determine the current real-time number of users that are currently located within a pre-defined polygon or circle of geographical area (e.g., "17 users are currently within 20 meters of the Waterfall"); (d) may determine a temporary or fixed burden or over-crowding of a particular region or trail or point-of-interest, or of lack-of-interest in particular regions or trails or points-of-interest (e.g., "85% of users or 153 users are currently at the Waterfall, over-crowded"; or "Out of 180 users that currently visit, only 3 users are at the Red Trail, so no need for an extra inspector at that trail"); (e) similar insights with regard to a particular trail, or trail-segment, or area-of-interest.

Optionally, each one of these insights may further be filtered or sorted or grouped, by taking into account one or more of: user gender; user age, or age-range; language (e.g., based on the application language as downloaded or used by the user); and/or other user data which may be obtained about the user or by the user (e.g., whether the user is individual or part of a group or family), and/or taking into account past or historical usage (e.g., "show the number of male users, that have the Spanish version of the application, who have already been in this location in the past and are returning visitors").

Optionally, each one of these insights may be crossed with other insights, or may be produced in real-time, or may be generated retroactively (e.g., "show which day of the week was the most crowded at the Waterfall"). The system may thus generate reports or alerts, about the average or median time that users spend at the entire area, or at a particular trail or point-of-interest; graphs or charts of the number of users and/or the level of crowdedness at the entire area of at particular point (e.g., identifying a typical peak of 320 users on Sundays between 2 pm and 4 pm); generating of crowdedness maps or charts that take time elements into consideration (e.g., on Monday mornings, the Waterfall area is the most crowded) or that ignore time (e.g., in general, the Bridge area is the most crowded area); and/or other suitable insights.

The system may utilize a Crowdedness Map Generator, or other suitable module or unit, in order to collect location-based data or geo-spatial location data of the visitors that are within a pre-defined venue or region or geographical area. For example, the venue borders or perimeter may be defined by a venue administrator, by providing a set of geo-spatial coordinates that define a geographical polygon, or by providing a radius around a particular geo-spatial point or location (e.g., 900 meters radius around the Blue Waterfall), or by enabling the venue administrator to draw a polygon or a free-form shape on a computing device which shows a digital map of the venue and its surrounding and by tracking the shape or structure or polygon drawn by the venue administrator and defining it as the venue area.

The system may then utilize a database or list or lookup table or other suitable data storage format, in order to create and maintain and update a list of all portable end-user devices that are within that pre-defined venue area; for example, by receiving or collecting location-based data from all such devices, which may run an "app" or application or mobile application or mobile-friendly application (or browser-based application) that communicates with a central server of the venue administrator and which periodically (e.g., every 1 second, every 5 seconds, every N seconds, or the like) reports to such central server the current geo-spatial location of each such device. A venue crowdedness estimator may analyze the geo-spatial location data that is received from such multiple end-user devices; for each such data-item, the system determines whether the received location data is within (or is internal to) the defined venue perimeter, or conversely is outside of (or is external to) the defined venue perimeter; thereby filtering the data to create a first list of inside-the-venue devices and a second list of outside-the-venue devices (e.g., which still run or use the "app" or application associated with that particular venue).

The crowdedness map generator may generate a real-time (or near-real-time) dynamically-updating digital map, which indicates or depicts a map of the venue, and puts graphical on-screen indicator(s) for each user or end-user device that is known to be located within the venue (or outside the venue) at its relevant location. Such indicators may be, for example, a colored pixel or a group-of-pixels, or a flag or a location-point or other suitable indicator; and each such indicator may represent a single end-user device (or user) located there, or a pre-defined number of end-user devices (e.g., each indicator representing 5 users, or 10 end-user devices, or other number N of users or end-user devices). The crowdedness map may be generated with regard to current, real-time, data; and may also be generated, upon request by the venue administrator, with regard to historical data, thereby indicating historical or past crowdedness in a previous time-point or time-slot or time-interval, for example, by utilizing a database that logs and records the location-based data for each visitor and then by utilizing a filtering query to obtain the list of end-user devices that were located within the defined venue during a particular time-point or time-slot (e.g., on April 17 at 4:30 PM, or, on April 16 between 2:00 PM and 2:15 PM).

Figure 7:
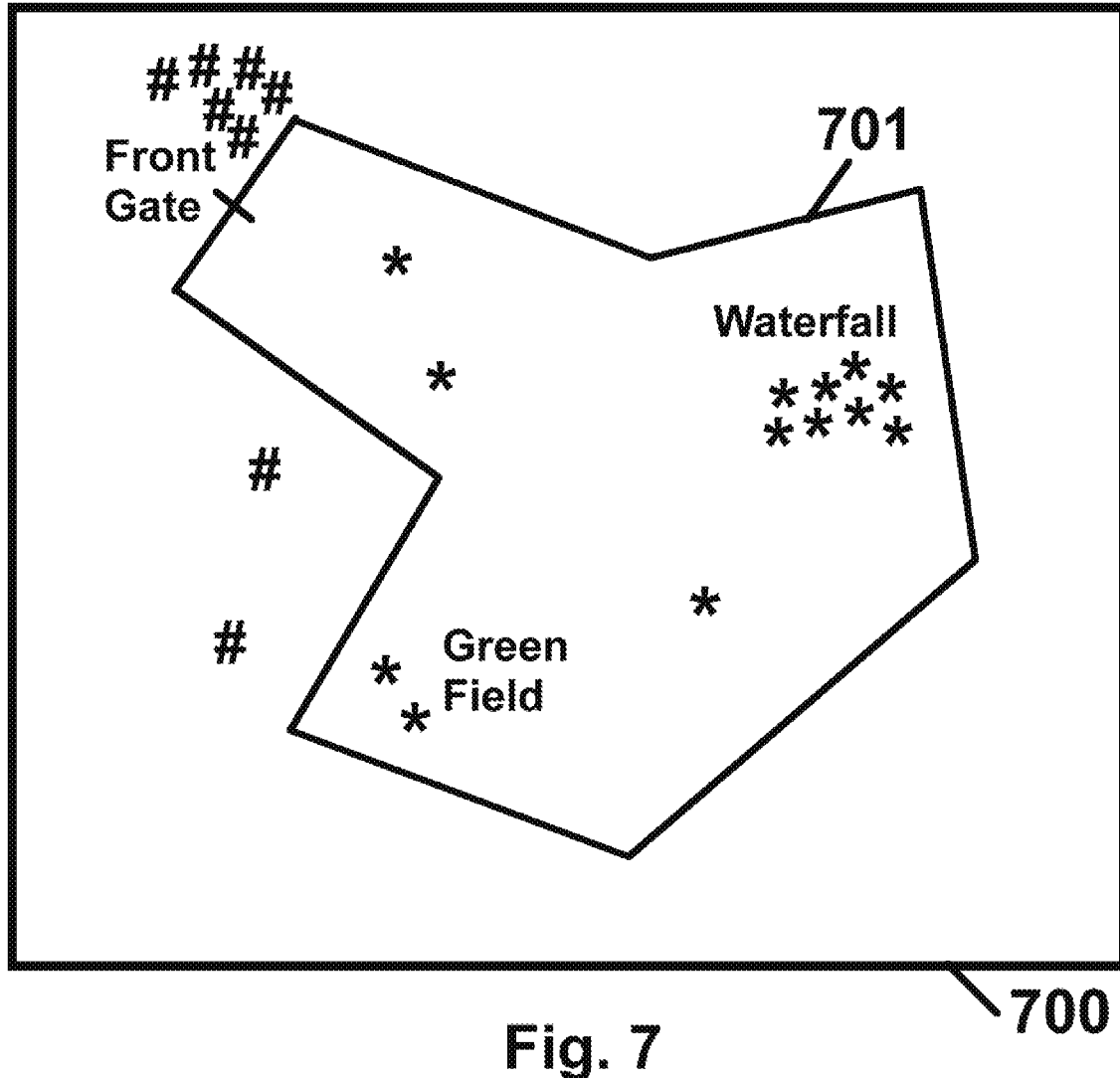
FIG. 7 is a schematic illustration of a crowdedness map, generated in accordance with some demonstrative embodiments of the present invention.

For example, FIG. 7 is a schematic illustration of a crowdedness map 700, generated in accordance with some demonstrative embodiments of the present invention. Map 700 may indicate or may depict a venue perimeter 701; may include indications of venue sub-regions (e.g., "the Green Field") or attractions (e.g., "the Waterfall"); may indicate using a first type of indicator (e.g., shown as asterisk circles, or by using a first particular color) users that are located within the venue and using the "app" of the venue; and may optionally indicate using a second type of indicator (e.g., shown as hashtag characters) users that are located externally to the venue and using the "app" of the venue.

Optionally, a crowdedness data analyzer may analyze the current and/or the historical location-based data, in order to generate current or real-time alerts to the venue administrator, or in order to generate long-term insights or recommendations to the venue administrator. For example, the system may analyze the current or the recent location-based data of users, and may detect that currently there is crowdedness beyond a pre-defined threshold value (e.g., more than N users per area of 50 square meters) at a particular sub-region of the venue, and may indicate such current crowdedness to the venue administrator (e.g., "consider to send an inspector to that area to check the situation there). The system may also analyze the past data or the historical data of locations of users, and may extract or generate insights, such as, "there is typically over-crowdedness of more than N users per area of 40 square meters near the Waterfall on Sundays between 1 PM to 3 PM"). The system enables the venue administrator to define and to modify the parameters or threshold values or ranges that indicate crowdedness or user density, over-crowdedness or over-density (e.g., relative to a density threshold or a crowdedness threshold), non-crowdedness or emptiness or lack of visitors or increased number of visitors or reduced number of visitors, with regard to the entire venue, or with regard to a particular sub-region thereof (e.g., indicated as a polygon or other shape drawn on a map of the venue), or with regard to a particular attraction therein;

and/or in relation to a particular time-slot or time-of-day or day-of-week (e.g., enabling the administrator to define that 18 visitors near the Waterfall at 11 AM is not over-crowded, but that 18 visitors near the Waterfall at 3:55 PM is crowded since the nature center is closing at 4:00 PM; or defining that 23 or more visitors at the Green Forest is not over-crowded on Sundays and is crowded on other days, since on Sundays there are additional team members or inspectors in the venue or at that region).

As demonstrated in FIG. 7, the crowdedness map 700 may indicate, for example, that currently there is crowdedness or high-density of visitors (indicated by seven Asterisk signs) near the Waterfall attraction or sub-region; that currently there is not crowdedness near the Green Field (indicated by only two Asterisk signs there); and further showing other users with their locations through-out the venue. The crowdedness map or visitor density map may further indicate the crowdedness or density of external users that did not yet enter the venue and are still external to the venue perimeter, indicated by Hashtag signs, outside of the venue perimeter; for example, a newly-arriving group of users that is approaching the front gate from the outside of the venue and are about to enter into the venue soon, and indicating to the administrator to open an additional ticket booth or cash register at the venue entrance. Such maps may provide valuable real-time data to the venue administrator and team, as well as long-term utilization data of the venue (e.g., indicating which regions are more visited than others, or the like).

It is noted that the map 700 may be dynamically-changing, such that the Indicators depicted on the map (e.g., Asterisk signs, Hashtag signs, in the depicted example) are actually moving on the digital map (e.g., presented to the venue administrator), in real time or in near-real-time according to actual real-life movement of the respective end-users in the venue or outside the venue; thereby enabling the venue administrator to obtain a real-life, dynamically updated, crowdedness map and/or visitors map of the venue.

In some embodiments, optionally, the venue administrator may click on a particular indicator of a particular end-user device, for example, in order to selectively send a private message only to that particular user, or in order to view the user profile of that particular user. For example, the real-time map may indicate with on-screen indications, each visitor and his or her current location in the venue; the venue administrator may notice that a particular user is located at a particular region (e.g., near the High Cliff) for a long period of time (e.g., more than K minutes, where K is 5 or 8 or 10 or other value), and may send a private message through the venue "app" only to that particular user, asking if he needs assistance or whether he got lost. In some embodiments, the system may be used to define that a particular region of the venue is a region that, if a user is located within it for a pre-defined time period, then an administrator is alerted and/or that a process begins in which a private message is sent to that particular user to inquire if he is well and if he needs assistance.

The system enables the venue administrator to selectively send a particular message, only to inside-the-venue devices (e.g., a message of "the venue will be closing in 10 minutes, please head towards the exit); or to send a particular message only to outside-the-venue devices that run the application of the venue (e.g., a message of "our front gate will open in 5 minutes, get ready to enter our Nature Center"); or to send a particular message to both the users on the first list and the users on the second lists (e.g., a message of "a visitor to our Nature Center forgot a blue jacket near the restroom, please come to retrieve it if it is yours)". Optionally, the system enables the venue administrator to selectively define a subset of users, from the first list and/or from the second list, that will receive a particular message; for example, based on known user characteristics, user age, user age range, user gender, user family status or companions (e.g., hiking alone or hiking as part of a family or a group), user history (e.g., send a message only to users that visited this venue at least three times in the past year; or conversely, only to users that this is their first-ever visit to this venue), or the like, by using user-specific characteristics that are obtained from a user-defined profile, or from analysis of the user's behavior or historical behavior in the venue (e.g., identifying based on location-based data analysis, that the user had typically hiked in trails that are oriented to disabled persons, and therefore tagging that particular user as a recipient of messages that are directed to hikers that are interested in such type of trails, or as a recipient of messages that are directed to disabled persons, or the like).

Similarly, the system enables the venue administrator not only to selectively send messages or alerts or notifications to a subset of the users of the "app" of the venue; but also, for example, to extract useful information or insights with regard to such users and with regard to the venue itself. For example, the venue administrator may query the system to analyze all the location-based data of Sunday, April 23rd; and to generate the following information items: (a) which 30-minute time-slot on that Sunday has the most visitors within the venue; (b) which 15-minute time-slot on that Sunday has the most visitors to the Waterfall attraction; (c) which attractions are most visited on that Sunday, or on all the Sundays in year 2016, by all the visitors to the venue, or alternatively by the visitors that are known to be in the age range of 25 to 35 years old, or alternatively by the visitors that are known to be female, or alternatively by the visitors that are using a particular version or language-version of the venue application (e.g., all users who utilize the French language interface of the application), or a combination of such queries or filters or conditions.

In some embodiments, the system administrator may define one or more actions that would be automatically performed, by one or more machines or devices of the venue or in the venue, when one or more triggering conditions hold true, particularly based on crowdedness-related conditions or triggers. For example, the system may define that if a particular region of the venue has a level-of-crowdedness that is greater than a pre-defined threshold value (e.g., more than 50 persons within a radius of 30 meters around the Waterfall), then one or more actions would be automatically performed by the system, for example, automatically closing a gate that leads to that region or attraction, or automatically sending a summon notification to a team-member or inspector of the venue to reach that particular location. In another example, the system may define that if the crowdedness level exceeds the pre-define threshold, then other suitable operations may be automatically triggered; for example, a command or indication that a Vending Machine requires additional inventory or supply of beverages due to increased number (or quantity) of visitors, or that the Cafeteria requires two more waiters or employees in order to alleviate the crowdedness therein, or the like. Other suitable notifications or actions may be generated or performed, based on such pre-defined conditions or triggers.

The application may further allow the administrator of the Nature Center to communicate with the currently-hiking users; to send them notifications or alerts; to send them a welcome message as they enter the zone of the Nature Center; to send them a goodbye message when they exit the zone of the Nature Center; to send notifications to particular users, or to users that are located in a particular region (e.g., only to users that are located at the Waterfall, or that are on the Red Trail); to send notifications to users by taking into account age, age-range, language, gender, and/or other parameters. Optionally, the application may further allow the administrator to receive messages from users via the same application; such as, to receive questions or requests, or distress messages, from a user, optionally accompanied by user data and user location, thereby allowing the administrator to provide advice, solutions and/or help to such users.

In some embodiments, optionally, the system may generate an ad-hoc social network, or content-sharing group, or messaging group, that may enable (only) users that utilize the application and that are located within the Nature Center zone to communicate with each other, anonymously or non-anonymously. Optionally, these features may be operational at a fine resolution or granularity; for example, enabling the system to generate an ad hoc social network, or ad hoc content-sharing group, or ad hoc messaging group, only among users that are currently hiking on the Yellow Trail, or among users that are currently at the Waterfall point-of-interest.

It is clarified that the Nature Center is discussed herein as a demonstrative example only, and the features of the present invention may be used in conjunction with various other types of locations and/or entities and/or venues.

In some embodiments, the owner or administrator or operator of such location or venue, may utilize a step-by-step "wizard" tool or interface, in order to input or to upload information or data-items (e.g., name of the venue; contact details of the venue; days and hours of operation of the venue; graphical file with a map of the venue; or the like), thereby enabling such administrator to efficiently construct a digital presence (e.g., "app" or website) that corresponds to that particular venue and facilitates the touring of such venue by visitors. Upon completion of the data-entry/data-upload process, the system may automatically generate, for example, a digital interactive brochure of the venue, which can be shared with visitors and/or can be accessed or downloaded by visitors, and which enable such visitor to utilize for navigation purposes (e.g., clicking on an image in the digital brochure cases the end-user device to present navigation data and route guidance information from the current location of the user towards the geo-spatial location that is depicted in that particular image), or to utilize for other purposes (e.g., to receive pop-up messages about the venue; to receive pop-up messages when the user gets closer to a particular location in the venue; to communicate with the administrative personnel of that venue, or the like). The system also generates a dashboard or a control panel, or other suitable interface, that enables the administrator of the venue to perform data mining and/or to receive the various insights that the system may automatically generate based on the collected data (e.g., a notification that "There is currently an excessive number of visitors at the Waterfall location, please consider to send a crew-member there").

Some embodiments may utilize community-based features or "wisdom of the crowd" modules, in order to generate insights and/or information for travelers and for users. For example, the system may enable users to report that a particular walking trail (e.g., the Red Trail at the Nature Center) is currently blocked due to a fallen tree, or has a trip hazard or an obstacle, or conversely has a time-sensitive attraction (e.g., a rare white owl is currently being spotted near the Waterfall); and such information and/or insights from other travelers, in an aggregated form and/or as single messages, may be provided to other users in that venue or near such location, and/or may be provided to the venue administrators and team-members.

In some embodiments, the system enables the venue administrator to define "permanent attractions" in the venue, as well as "temporary attractions" in the venue. For example, the Blue Waterfall or the Pointy Cliff may be "permanent" attractions in the Nature Center venue, because they exist there all-year-round, perpetually and continuously; and may be indicated as such "attractions" on any map used by the end-users through the application of the venue. In contrast, a family of deer is currently spotted by a team-member of the venue administration team in the northeast corner of the Green Field of the venue; and the venue administrator may command the system, in real time, to immediately display "Family of Deer" attraction indicators on all the maps that are shown via the "app" of the venue, at that particular location; and may further command the system to remove that attraction from all maps after N minutes (e.g., after 30 minutes) since this attraction is temporary in its nature. Furthermore, if the inspector on behalf of the venue administrator notices that the Deer Family has relocated from the Green Field to the Blue Waterfall, the venue administrator may command the system to update all the maps that are shown in real time to users of the application, such that the indicator of the Deer Family is accordingly moved on the map to its new real-life location, thereby enabling the system to generate a real-time, dynamically changing, map of temporary or non-permanent attractions.

The Applicants have realized that conventional mapping systems, navigation systems, and route-guidance systems do not adequately present information, (i) that indicates to the user that the user is currently deviating from the correct route to the destination, and/or (ii) that depict to the user his current deviation relative to the correct route, and/or (iii) that provides to the user corrective ad-hoc route-guidance to get back on the right track and to correct the deviation, and/or (iv) to provide ongoing feedback to the user as he corrects his deviation, and/or (v) to provide reassurance or confirmation to the user as he travels within the correct route to his destination and/or while he is still performing a correction of deviation from the right track.

The Applicants have realized that these deficiencies of conventional systems, may be cured or mitigated by providing to the user unique indications; for example, by generating and displaying to a deviating user (e.g., that deviated from the correct route to his intended destination), a first on-screen line indicating the "correct" route to be taken, as well as a second, differently looking, concurrent, on-screen line that indicates the deviated route that was or is currently being taken by the deviating user; and/or by providing to the user, a first Factual Navigation Arrow, that indicates and that points at the current, de facto, real life, actual, direction that is currently engaged by the user; as well as a second, concurrent, differently looking, Corrective Navigation Arrow that indicates to the user which direction to take (e.g., temporarily) in order to correct his deviation from the correct route to the destination.

Figure 8:
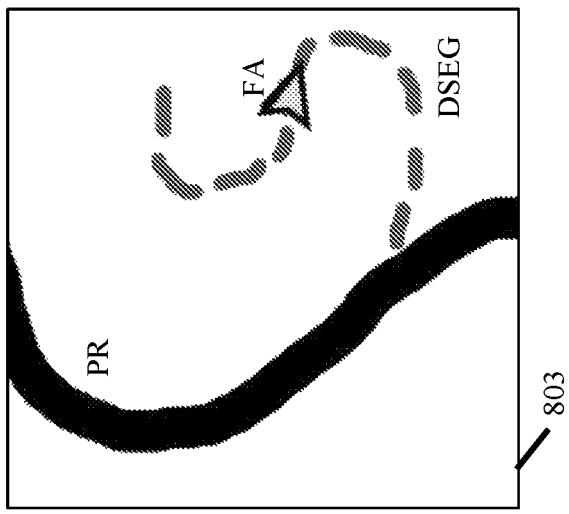
FIG. 8 is a schematic illustration of three mapping and navigation panels, generated by some demonstrative embodiments of the present invention.
Figure 8:
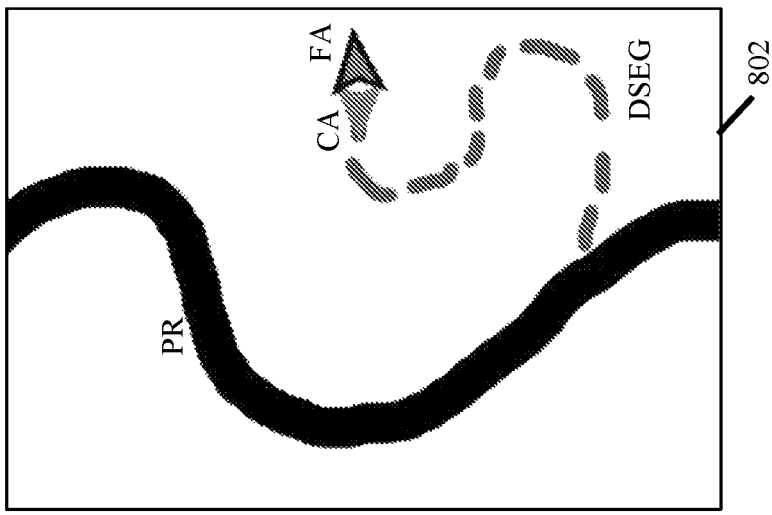
Figure 8:
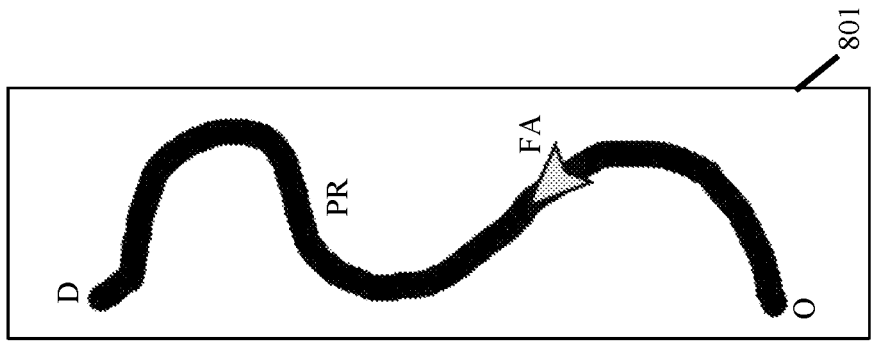

Reference is made to FIG. 8, which is a schematic illustration of three mapping/navigation panels 801-803, generated by some demonstrative embodiments of the present invention. Panels 801-803 may be screens in a mapping or navigation or route-guidance "app" or application, operable on a portable electronic device (e.g., smartphone, tablet) that is carried by a user; particularly a hiker that walks by foot, or travels by bicycle, although vehicular users may also benefit from such features.

As demonstrated in navigation panel 801, the user of a portable electronic device (e.g., smartphone or tablet) is travelling from an initial Origin point (O), to an intended Destination point (D); for example, after indicating to the system that he wishes to reach Destination point D. The navigation/mapping module may be client-side or server-side or may utilize a hybrid client-and-server implementation; and may generate a Planned Route ("PR") that is displayed on the screen of the end-user device, indicating the suggested route, that is suggested by the mapping/navigation system, to travel from origin point O to destination point D. The planned route PR may be shown in a particular color, for example, Green color. As the user travels along the planned route PR, a Factual Arrow (FA) is presented and displayed, pointing towards the direction that the user is actually, factually, progressing in. In the depicted example of panel 801, the location-based data of the end-user device, indicates that in the past K seconds (e.g., in the past 3 or 5 or 10 seconds) the user has moved north-west along the Planned Route (PR); and therefore the Factual Arrow (FA) is shown, pointing to the upper-left corner (north-west), and being located on the Planned Route (PR) itself.

As demonstrated in navigation panel 802, the user has deviated from the Planned Route 801, either intentionally (e.g., to capture a photograph of a running deer) or unintentionally or unknowingly (e.g., the user wandered away from the Planned Route). The system of the present invention detects that the user deviated or deviates from the Planned Route PR. The system continues to generate, render and display the Planned Route on the screen of the end-user device. However, the system also generates, renders and displays an additional on-screen line, indicating the Deviated Segment (DSEG) that was actually walked or traveled by that user, displayed in a different on-screen color or characteristic. For example, the Planned Route PR may be displayed as a thick green line; whereas the Deviated Segment may be displayed as a thin, red, broken line; thereby enabling the user to concurrently view, on the same screen and at the same time, both the Planned Route (PR) and his actual Deviated Segment (DSEG). Furthermore, in addition to the Factual Arrow (FA) that is displayed, and which continues to indicate the current, actual, direction-of-progression of the user, the system may further generate and display, concurrently, a secondary, differently looking, Corrective Arrow (CA) or other correction indicator, which indicates to the user which direction he should take, not in order to reach the Destination point D in the shortest way, but rather, which direction he should take in order to back-track his actual route and to get back to the Planned Route (PR) at the same point that he started to deviate, or alternatively, pointing to the user which alternative segment to take (e.g., at which direction to walk or to travel) in order to get back on the Planned Route. The system of the present invention thus generates and displays, uniquely, in a concurrent manner on the same screen of the end-user device, both the Planned Route (PR) and the Deviated Segment (DSEG), as well as the Factual Arrow (FA) and the Corrective Arrow (CA); thereby providing enriched information to the end-user that would enable him to correct his deviation safely and efficiently.

The Applicants have realized that, unlike conventional systems that always attempt to navigate the user towards the "final destination" point, regardless of deviations, it may actually be safer and more beneficial, at least for some users, and particularly in the context of on-foot hiking in non-urban areas or in rural areas, to guide the user to back-track and walk-back on his exact deviation route in order to return to the Planned Route.

As demonstrated in navigation panel 803, based on the Corrective Arrow (CA) that was displayed to him in panel 802, the user now returns back along his Deviated Segment (DSEG), on his way back towards the Planned Route (PR). Accordingly, the Factual Arrow (FA) is now generated and displayed, showing the user progressing back along the Deviated Segment); and furthermore, the Corrective Arrow (CA) is removed or is non-displayed (or his hidden by the Factual Arrow FA), since there is no need for the user to "correct" the actual direction of his travel, as the user is currently progressing in the correct direction, which is the segment that would bring him back to the Planned Route.

In another demonstrative example, the application may be used by a cruise ship or other type of vessel or boat or ship, thereby allowing the captain or the ship administrator to obtain real-time statistics about users (e.g., boat passengers) that are on the boat and/or that are on-the-shore. For example, the ship administrator may send an alert to all passengers, or only to on-shore passengers, alerting them that the ship will sail away in 30 minutes.

Figure 5A:
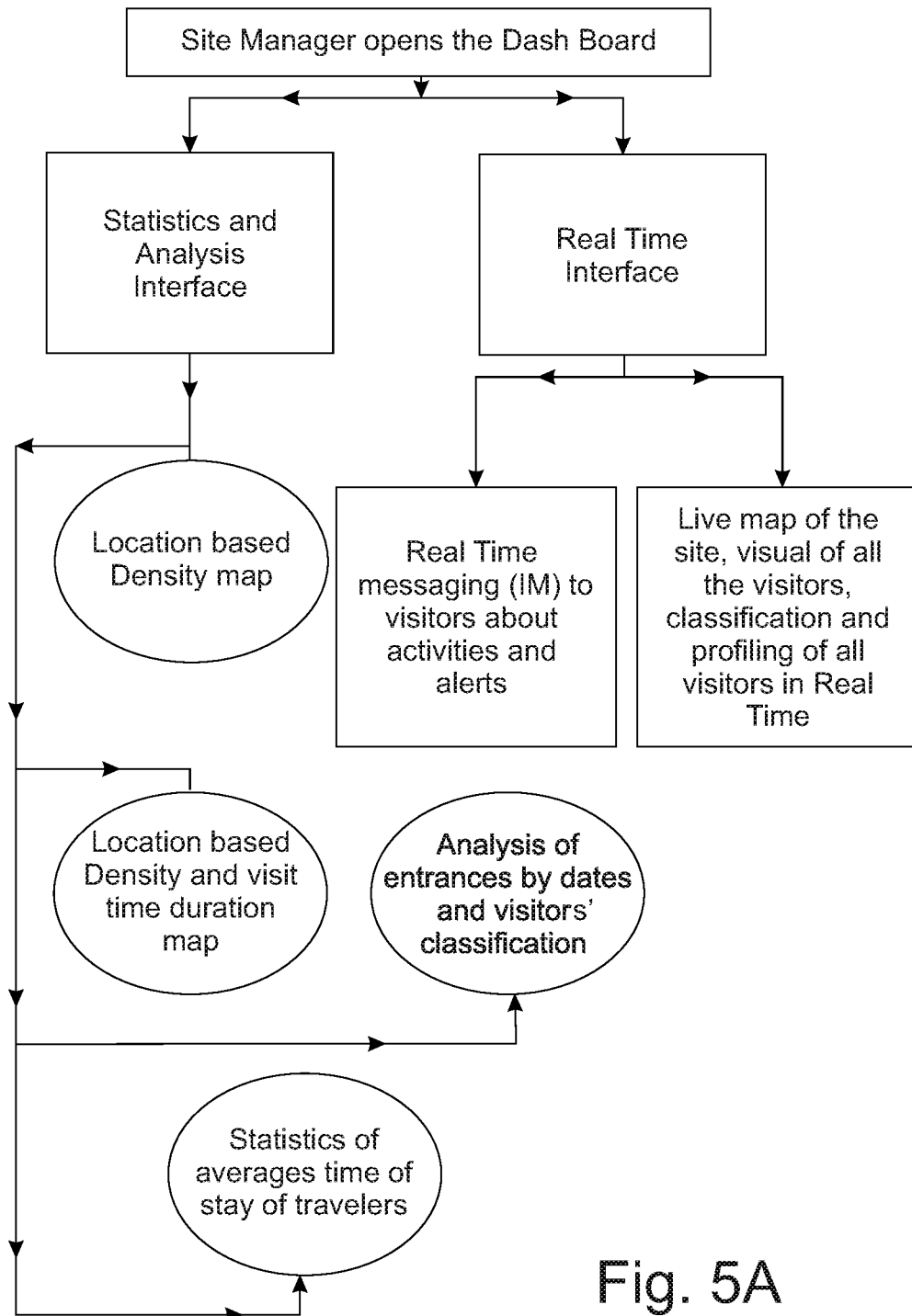
FIGS. 5A-5B are schematic illustrations demonstrating the operations and features of the system when utilized by a business user, such as administrator of a venue, in accordance with some demonstrative embodiments of the present invention.
Figure 5B:
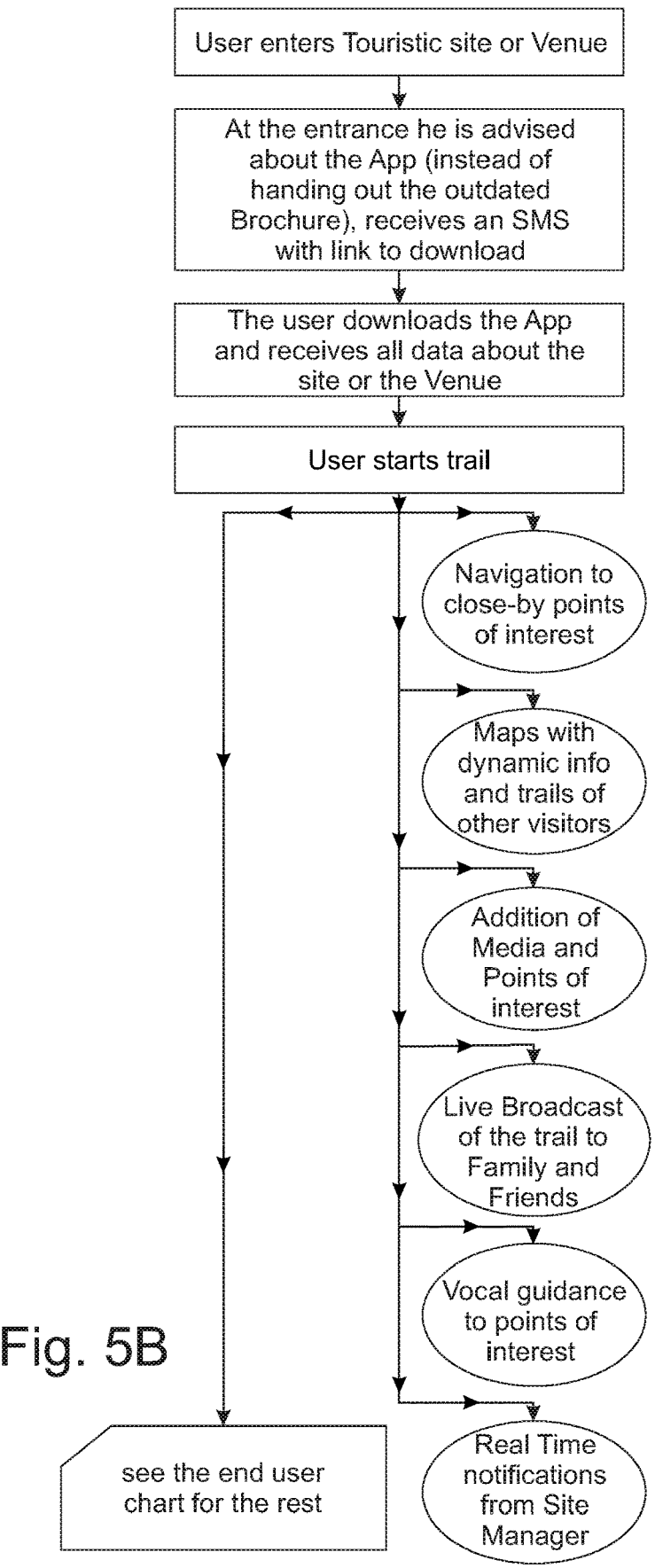

Reference is made to FIGS. 5A-5B, which are schematic illustrations demonstrating the operations and features of the system when utilized by a business user (e.g., an administrator of a location or an area, such as a Nature Center), in accordance with some demonstrative embodiments of the present invention.

Figure 6A:
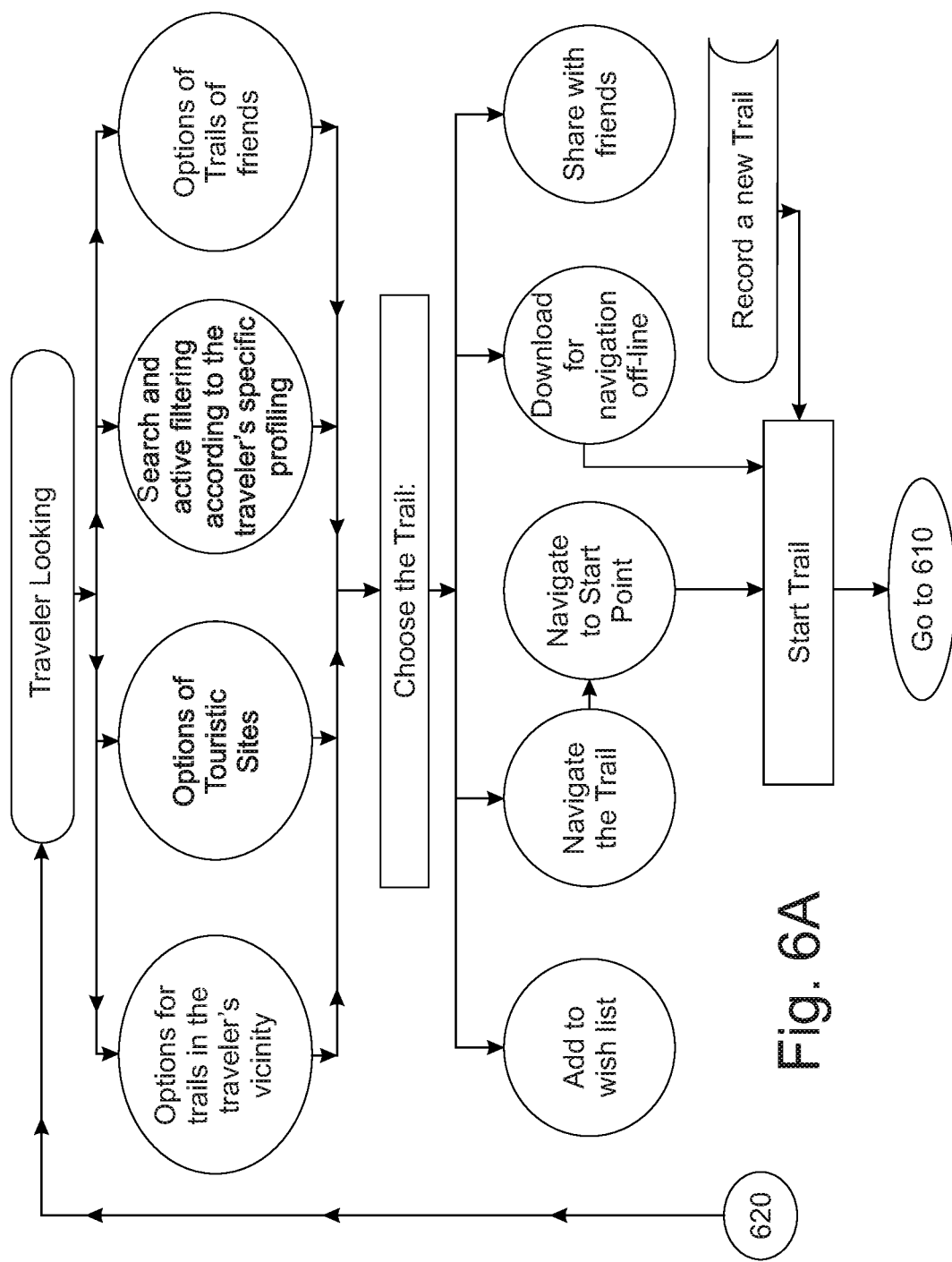
FIGS. 6A-6C are schematic illustrations demonstrating the operations and features of the system when utilized by an end-user, such as a traveler carrying a portable electronic device, in accordance with some demonstrative embodiments of the present invention.
Figure 6B:
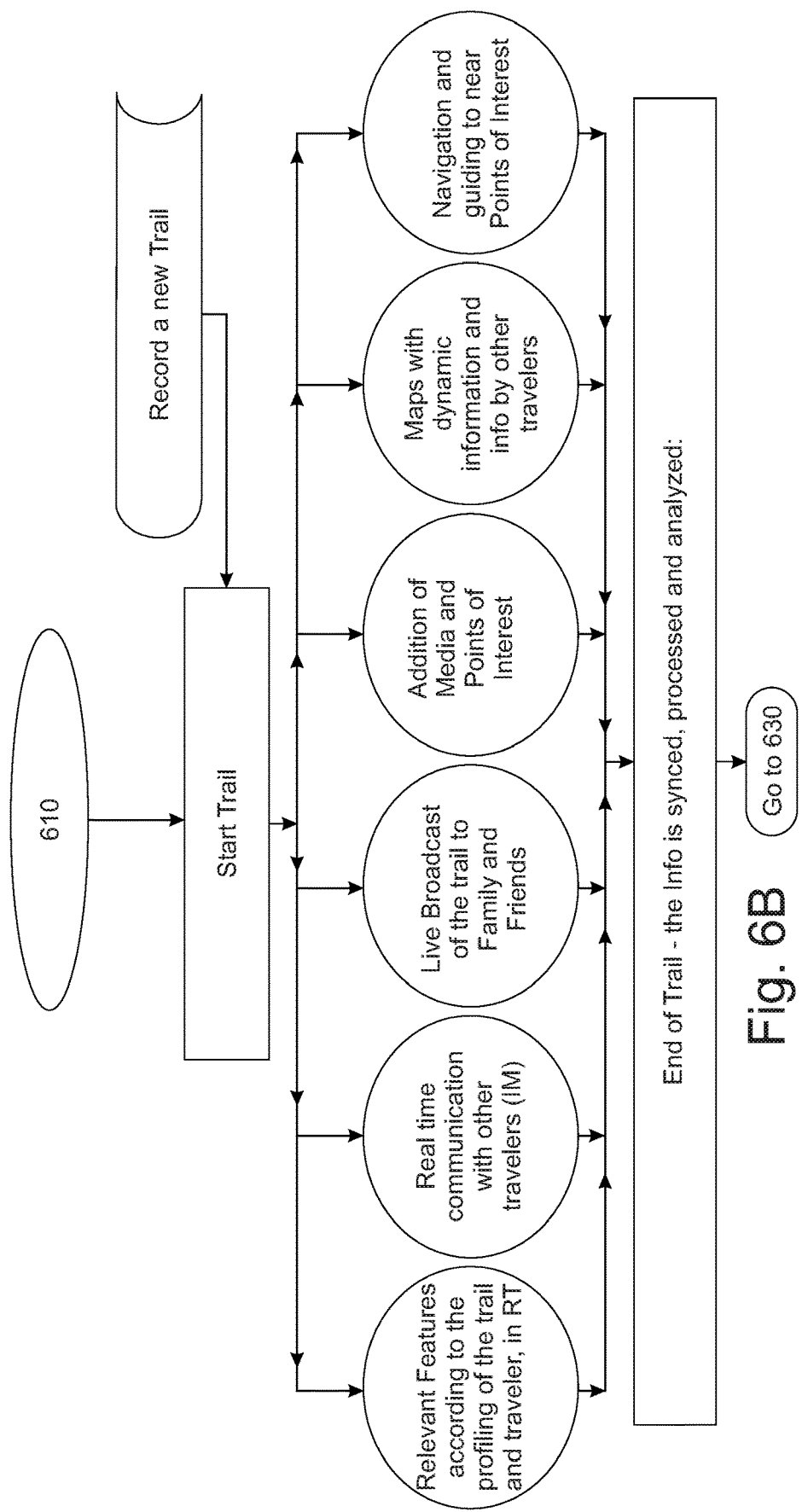
Figure 6C:
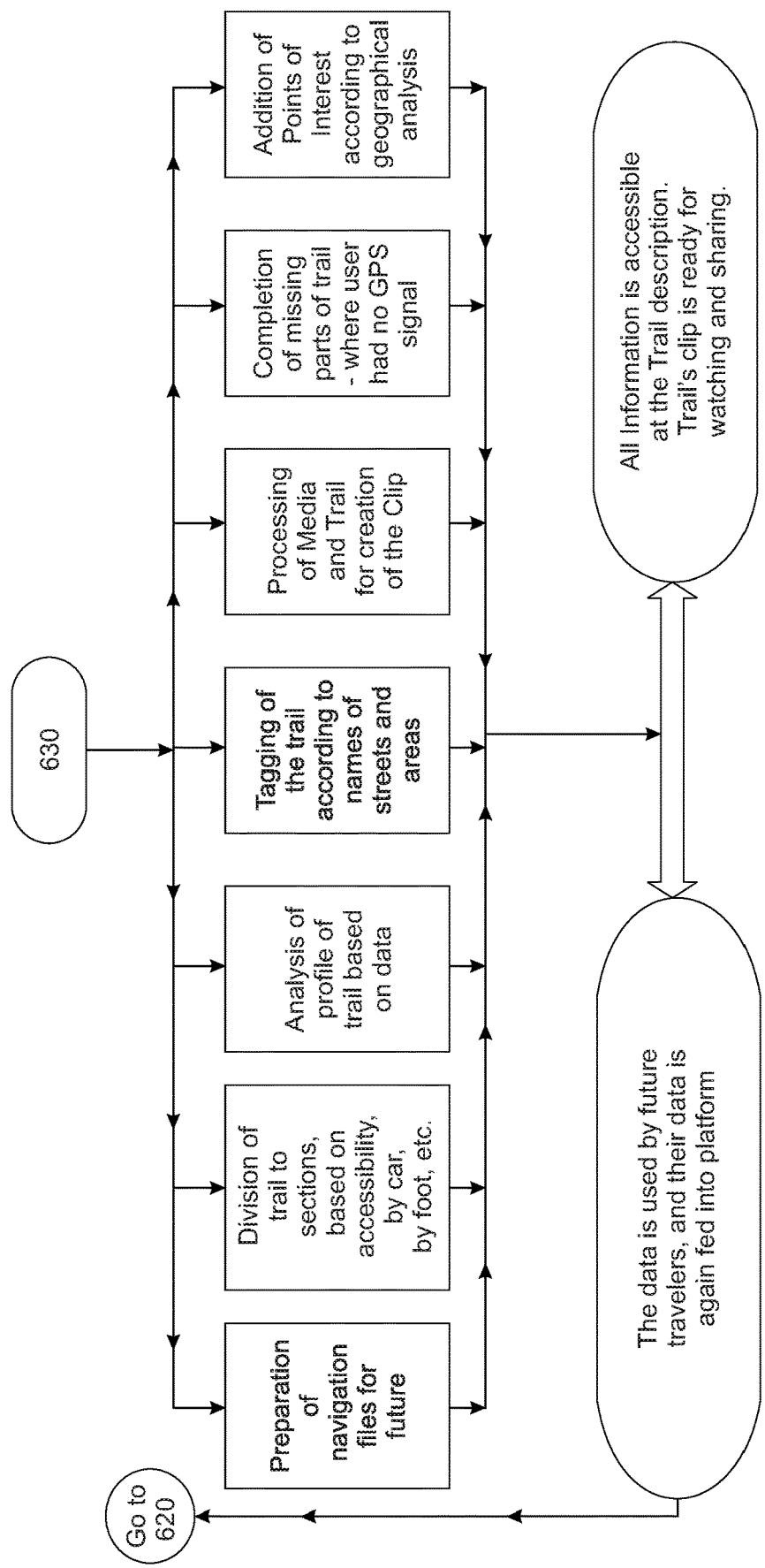

Reference is made to FIGS. 6A-6C, which are schematic illustrations demonstrating the operations and features of the system when utilized by an end-user (e.g., a traveler having a portable electronic device), in accordance with some demonstrative embodiments.

In some embodiments, a method comprises: (a) receiving location data from an electronic device of a traveler; (b) determining that said traveler moved from a first geographical point to a second geographical point; (c) determining that the location data, received from said electronic device of said traveler, lacks at least a portion which correspond to a route-segment between the first geographical point and a second geographical point; (d) determining which route-segment said traveler took when he moved from the first geographical point to the second geographical point, out of two or more possible route-segments that connect the first and the second geographical points.

In some embodiments, the determining of claim (d) comprises: (d1) based on geo-location data, determining which transportation mode was utilized by said traveler; (d2) based on said transportation mode, determining which route-segment was taken by said traveler when he moved from the first geographical point to the second geographical point.

In some embodiments, the determining of claim (d) comprises: (d1) based on analysis of audio data captured by said electronic device, determining which transportation mode was utilized by said traveler; (d2) based on said transportation mode, determining which route-segment was taken by said traveler when he moved from the first geographical point to the second geographical point.

In some embodiments, the determining of claim (d) comprises: (d1) based on analysis of vibration data captured by said electronic device, determining which transportation mode was utilized by said traveler; (d2) based on said transportation mode, determining which route-segment was taken by said traveler when he moved from the first geographical point to the second geographical point.

In some embodiments, the method comprises: generating real-time hot-and-cold navigation data to a destination point, in a venue that lacks a pre-defined travel route to said destination point, by indicating to said traveler, whether a current movement of said traveler (i) brings said traveler closer to said destination point or (ii) takes said traveler further away from said destination point.

In some embodiments, the method comprises: based on an analysis of historical trails, that were traveled by said traveler at other venues, determining whether said traveler has moved from the first point to the second point via a first candidate trail-segment or by a second, different, candidate trail-segment.

In some embodiments, the method comprises: based on an analysis of user characteristics that were provided by said travelers, determining whether said traveler has moved from the first point to the second point via a first candidate trail-segment or by a second, different, candidate trail-segment.

In some embodiments, the method comprises: determining that a particular trail-segment exists in real-life, between a first real-life point and a second real-life point, wherein location-based data is unavailable between the first and second real-life points, wherein the first real-life point is a point in which said traveler lost geo-location data until reaching said second real-life point; wherein said determining is performed based on a time difference between said traveler being at said first real-life point and said traveler being at said second time-point.

In some embodiments, the method comprises: receiving from said electronic device a first, full-size, geo-location GPS data-item indicating a first geo-location of said electronic device; subsequently, receiving from said electronic device only reduced-size data-items that comprise a truncated version of full geo-location GPS data.

In some embodiments, the method comprises: receiving from said electronic device a first, full-size, geo-location GPS data-item indicating a first geo-location of said electronic device; subsequently, receiving from said electronic device only reduced-size data-items that comprise an indication of geo-spatial displacement relative to said first geo-location.

In some embodiments, the method comprises: determining that a particular travelling-trail is located in proximity of not more than N meters relative to a particular real-life feature; automatically tagging said travelling-trail, in a computerized mapping system, as a trail that has said particular real-life feature; performing a search process or a filtering process, via said computerized mapping system, for trails that have only said real-life feature.

In some embodiments, the method comprises: determining that a first traveler walked from a first point to a second point via a first walking trail; determining that a second traveler walked from said first point to said second point via a second walking trail which is not-identical to said first walking trail; merging together said first walking trail and said second walking trail, into a single unified walking trail that connects the first point to the second point; subsequently, in response to a query of a third traveler querying how to move from the first point to the second point, generating a query response that comprises said single unified walking trail, and does not comprise separately said first and second walking trails.

In some embodiments, the method comprises: based on geo-location data, determining that a particular user traveled via car from a first point to a second point; based on analysis of audio data, captured by an electronic device of said particular user, determining a make and a model of said car.

In some embodiments, the method comprises: based on geo-location data, determining that a particular user traveled via car from a first point to a second point; based on analysis of vibration data, captured by an electronic device of said particular user, determining a make and a model of said car.

In some embodiments, the method comprises: automatically generating a multimedia clip that comprises: (i) a graphical representation of a map of a venue traveled by said traveler, (ii) a graphical indication of a particular trail that was taken by said traveler within said venue, (iii) an image that was captured by said traveler at a particular point of said particular trail. In some embodiments, said generating comprises: based on an analysis of one or more parameters of said venue and said particular trail, automatically selecting a pre-defined template for constructing said multimedia clip.

In some embodiments, the method comprises: (A) receiving from an administrator device, data that defines boundaries of a user-defined geographical venue; (B) automatically maintaining and updating a list of electronic communication devices that are currently located within said user-defined geographical venue; (C) transmitting a message from said administrator device, only to electronic communication devices that are currently within said list, and not to electronic devices that are currently outside of the user-defined geographical venue.

In some embodiments, the method comprises: (A) receiving from an administrator device, data that defines boundaries of a user-defined geographical venue; (B) automatically maintaining and updating a list of electronic communication devices that are currently located within said user-defined geographical venue; (C) transmitting a message from said administrator device, only to a defined subset of the electronic communication devices that are currently within said list, and not to electronic devices that are currently outside of the user-defined geographical venue; wherein the defined subset is created by said administrator based on one or more filtering parameters; wherein said filtering parameters comprise at least: (i) a first filtering parameter that filters-in or filters-out recipients based on user data, and (ii) a second filtering parameter that filters-in or filters-out recipients based on proximity to a particular geo-location point.

In some embodiments, the method comprises: (A) receiving from an administrator device, data that defines boundaries of a user-defined geographical venue; (B) automatically maintaining and updating a list of electronic communication devices that are currently located within said user-defined geographical venue; (C) receiving from an electronic device, of a particular electronic communication device that is on said list; (D) transmitting said message, only to all other electronic communication devices that are currently within said list, and not to electronic devices that are currently outside of the user-defined geographical venue.

In some embodiments, the method comprises: (A) receiving from an administrator device, data that defines boundaries of a user-defined geographical venue; (B) automatically maintaining and updating a list of electronic communication devices that are currently located within said user-defined geographical venue; (C) constructing an ad-hoc, closed, social network that enables sharing of data-items only among users of electronic communication devices that are currently located within said user-defined geographical venue.

In some embodiments, the method comprises: (A) receiving from an administrator device, data that defines boundaries of a user-defined geographical venue which comprises a particular point-of-interest; (B) automatically maintaining and updating a list of electronic communication devices that are currently located within said user-defined geographical venue; (C) transmitting a message from said administrator device, only to a subset of the electronic communication devices that are currently within said list and that are currently located within a pre-defined distance from said particular point-of-interest.

In some embodiments, the method comprises: (A) receiving from an administrator device, data that defines boundaries of a user-defined geographical venue; (B) automatically maintaining and updating a list of electronic communication devices that are currently located within said user-defined geographical venue; (C) generating region-crowdedness maps pertaining to different regions within said user-defined geographical venue.

In some embodiments, the method comprises: (A) receiving from an administrator device, data that defines boundaries of a user-defined geographical venue; (B) automatically maintaining and updating a list of electronic communication devices that are currently located within said user-defined geographical venue; (C) generating region-crowdedness maps pertaining to different regions within said user-defined geographical venue; (D) automatically detecting that in a particular region, a level of crowdedness is currently greater than a pre-defined threshold value; and generating an alert message indicating over-crowdedness in said region.

In some embodiments, the method comprises: (A) receiving from an administrator device, data that defines boundaries of a user-defined geographical venue; (B) automatically maintaining and updating a list of electronic communication devices that are currently located within said user-defined geographical venue; (C) generating data indicating at least: (i) an average speed of movement of travelers within a particular region of said user-defined geographical venue; (ii) a number of travelers that are currently located within a particular region of said user-defined geographical venue; (iii) an average time-length of stay, of travelers in a particular region of said user-defined geographical venue.

In some embodiments, the method comprises: (A) analyzing data of previous trails that were hiked by said traveler; (B) determining that said traveler has engaged in the past with trails that have a particular characteristic; (C) based on step (B), determining that a current trail that is hiked by said traveler, has said particular characteristic; (D) tagging the current trail that is hiked by said traveler, as a trail having said particular characteristic.

In some embodiments, the method comprises: (A) analyzing user-specific data that is comprised in a user-profile of said traveler; (B) based on step (A), determining that said traveler has a particular characteristic; (C) based on step (B), determining that a current trail that is hiked by said traveler, is a trail that is oriented towards travelers that have said particular characteristic; (D) tagging the current trail that is hiked by said traveler, as a trail that is oriented towards travelers that have said particular characteristic.

In some embodiments, the method comprises: (A) determining that said traveler is travelling along a particular trail; (B) determining that said particular trail is oriented to travelers having a particular user-characteristic; (C) based on steps (A) and (B), determining that said traveler is a user that has said particular user-characteristic, and providing to said traveler a particular content-item that is directed to users that have said particular user-characteristic.

In some embodiments, the method comprises: (A) analyzing current geo-location data of said traveler; (B) detecting that said traveler currently deviates from a planned route that leads towards an intended destination point; (C) displaying a first on-screen indication of said planned route, and concurrently displaying a second, different, on-screen indication of a deviated segment that said traveler used.

In some embodiments, the method comprises: (A) analyzing current geo-location data of said traveler; (B) detecting that said traveler currently deviates from a planned route that leads towards an intended destination point; (C) displaying a first on-screen indication of said planned route, and concurrently displaying a second, different, on-screen indication of a deviated segment that said traveler used; (D) displaying an on-screen factual arrow that indicates an actual direction-of-progression of said traveler; and concurrently, displaying an on-screen corrective arrow that indicates a direction-of-corrective-progression that said traveler should take in order to correct a deviation from said planned route.

Although portions of the discussion herein relate, for demonstrative purposes, to wired links and/or wired communications, some embodiments are not limited in this regard, but rather, may utilize wired communication and/or wireless communication; may include one or more wired and/or wireless links; may utilize one or more components of wired communication and/or wireless communication; and/or may utilize one or more methods or protocols or standards of wireless communication.

Some embodiments may be implemented by using a special-purpose machine or a specific-purpose device that is not a generic computer, or by using a non-generic computer or a non-general computer or machine. Such system or device may utilize or may comprise one or more components or units or modules that are not part of a "generic computer" and that are not part of a "general purpose computer", for example, cellular transceivers, cellular transmitter, cellular receiver, GPS unit, location-determining unit, accelerometer(s), gyroscope(s), device-orientation detectors or sensors, device-positioning detectors or sensors, or the like.

Some embodiments may be implemented as, or by utilizing, an automated method or automated process, or a machine-implemented method or process, or as a semi-automated automated or partially-automated method or process, or as a set of steps or operations which may be executed or performed by a computer or machine or system or other device.

Some embodiments may be implemented by using code or program code or machine-readable instructions or machine-readable code, which may be stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such processor or machine or computer to perform a method or process as described herein. Such code or instructions may be or may comprise, for example, one or more of: software, a software module, an application, a program, a subroutine, instructions, an instruction set, computing code, words, values, symbols, strings, variables, source code, compiled code, interpreted code, executable code, static code, dynamic code; including (but not limited to) code or instructions in high-level programming language, low-level programming language, object-oriented programming language, visual programming language, compiled programming language, interpreted programming language, C, C++, C #, Java, JavaScript, SQL, Ruby on Rails, Go, Cobol, Fortran, ActionScript, AJAX, XML, JSON, Lisp, Eiffel, Verilog, Hardware Description Language (HDL, BASIC, Visual BASIC, Matlab, Pascal, HTML, HTML5, CSS, Perl, Python, PHP, machine language, machine code, assembly language, or the like.

Discussions herein utilizing terms such as, for example, "processing", "computing", "calculating", "determining", "establishing", "analyzing", "checking", "detecting", "measuring", or the like, may refer to operation(s) and/or process(es) of a processor, a computer, a computing platform, a computing system, or other electronic device or computing device, that may automatically and/or autonomously manipulate and/or transform data represented as physical (e.g., electronic) quantities within registers and/or accumulators and/or memory units and/or storage units into other data or that may perform other suitable operations.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments", "some embodiments", and/or similar terms, may indicate that the embodiment(s) so described may optionally include a particular feature, structure, or characteristic, but not every embodiment necessarily includes the particular feature, structure, or characteristic. Repeated use of the phrase "in one embodiment" does not necessarily refer to the same embodiment, although it may. Repeated use of the phrase "in some embodiments" does not necessarily refer to the same set or group of embodiments, although it may.

As used herein, and unless otherwise specified, the utilization of ordinal adjectives such as "first", "second", "third", "fourth", and so forth, to describe an item or an object, merely indicates that different instances of such like items or objects are being referred to; and does not intend to imply as if the items or objects so described must be in a particular given sequence, either temporally, spatially, in ranking, or in any other ordering manner.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a tablet, an on-board device, an off-board device, a hybrid device, a vehicular device, a non-vehicular device, a mobile or portable device, a consumer device, a non-mobile or non-portable device, an appliance, a wireless communication station, a wireless communication device, a wireless Access Point (AP), a wired or wireless router or gateway or switch or hub, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), or the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA or handheld device which incorporates wireless communication capabilities, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may comprise, or may be implemented by using, an "app" or application which may be downloaded or obtained from "app store" or "applications store", for free or for a fee, or may be pre-installed on a computing device or electronic device, or which may be otherwise transported to and/or installed on such computing device or electronic device.

Functions, operations, components and/or features described herein with reference to one or more embodiments, may be combined with, or may be utilized in combination with, one or more other functions, operations, components and/or features described herein with reference to one or more other embodiments.

While certain features of some demonstrative embodiments have been illustrated and described herein, many modifications, substitutions, changes, and equivalents may occur to those skilled in the art. Accordingly, the claims are intended to cover all such modifications, substitutions, changes, and equivalents.

The invention claimed is:

1. A method comprising:
   (a) receiving location data from an electronic device of a traveler;
   (b) determining that said traveler moved from a first geographical point to a second geographical point;
   (c) determining that the location data, received from said electronic device of said traveler, lacks at least a portion which corresponds to a route-segment between the first geographical point and a second geographical point;
   (d) determining which route-segment said traveler took when he moved from the first geographical point to the second geographical point, out of two or more possible route-segments that connect the first and the second geographical points;
   wherein the method comprises:
   generating real-time hot-and-cold navigation data to a destination point,
   in a venue that lacks a pre-defined travel route to said destination point,
   by indicating to said traveler, whether a current movement of said traveler
   (i) brings said traveler closer to said destination point or
   (ii) takes said traveler further away from said destination point;
   wherein the method is implemented by utilizing at least a hardware processor.

2. The method of claim 1, comprising:
   (A) receiving from an administrator device, data that defines boundaries of a user-defined geographical venue;
   (B) automatically maintaining and updating a list of electronic communication devices that are currently located within said user-defined geographical venue;
   (C) transmitting a message from said administrator device, only to electronic communication devices that are currently within said list, and not to electronic devices that are currently outside of the user-defined geographical venue.

3. The method of claim 1, comprising:
(A) receiving from an administrator device, data that defines boundaries of a user-defined geographical venue;
(B) automatically maintaining and updating a list of electronic communication devices that are currently located within said user-defined geographical venue;
(C) transmitting a message from said administrator device, only to a defined subset of the electronic communication devices that are currently within said list, and not to electronic devices that are currently outside of the user-defined geographical venue; wherein the defined subset is created by said administrator based on one or more filtering parameters; wherein said filtering parameters comprise at least: (i) a first filtering parameter that filters-in or filters-out recipients based on user data, and (ii) a second filtering parameter that filters-in or filters-out recipients based on proximity to a particular geo-location point.

4. The method of claim 1, comprising:
(A) receiving from an administrator device, data that defines boundaries of a user-defined geographical venue;
(B) automatically maintaining and updating a list of electronic communication devices that are currently located within said user-defined geographical venue;
(C) receiving from an electronic device, of a particular electronic communication device that is on said list;
(D) transmitting said message, only to all other electronic communication devices that are currently within said list, and not to electronic devices that are currently outside of the user-defined geographical venue.

5. The method of claim 1, comprising:
(A) receiving from an administrator device, data that defines boundaries of a user-defined geographical venue;
(B) automatically maintaining and updating a list of electronic communication devices that are currently located within said user-defined geographical venue;
(C) constructing an ad-hoc, closed, social network that enables sharing of data-items only among users of electronic communication devices that are currently located within said user-defined geographical venue.

6. The method of claim 1, comprising:
(A) receiving from an administrator device, data that defines boundaries of a user-defined geographical venue which comprises a particular point-of-interest;
(B) automatically maintaining and updating a list of electronic communication devices that are currently located within said user-defined geographical venue;
(C) transmitting a message from said administrator device, only to a subset of the electronic communication devices that are currently within said list and that are currently located within a pre-defined distance from said particular point-of-interest.

7. The method of claim 1, comprising:
(A) receiving from an administrator device, data that defines boundaries of a user-defined geographical venue;
(B) automatically maintaining and updating a list of electronic communication devices that are currently located within said user-defined geographical venue;
(C) generating region-crowdedness maps pertaining to different regions within said user-defined geographical venue.

8. The method of claim 1, comprising:
(A) receiving from an administrator device, data that defines boundaries of a user-defined geographical venue;
(B) automatically maintaining and updating a list of electronic communication devices that are currently located within said user-defined geographical venue;
(C) generating region-crowdedness maps pertaining to different regions within said user-defined geographical venue;
(D) automatically detecting that in a particular region, a level of crowdedness is currently greater than a pre-defined threshold value; and generating an alert message indicating over-crowdedness in said particular region.

9. The method of claim 1, comprising:
(A) receiving from an administrator device, data that defines boundaries of a user-defined geographical venue;
(B) automatically maintaining and updating a list of electronic communication devices that are currently located within said user-defined geographical venue;
(C) generating data indicating at least: (i) an average speed of movement of travelers within a particular region of said user-defined geographical venue; (ii) a number of travelers that are currently located within a particular region of said user-defined geographical venue; (iii) an average time-length of stay, of travelers in a particular region of said user-defined geographical venue.

10. The method of claim 1, comprising:
performing analysis of data pertaining to trip data;
determining the route segment that was actually walked by a group of users that are non-related to each other and that walked at different times;
determining an existence of a walking trail in real-life at a certain geo-location, by determining that two proximate trip segments of two different users are actually a single, unified, walking trail in real-life;
generating the single, unified, walking trail which reflects two or more varying real-life walking trails of two or more non-related users.

11. The method of claim 10, comprising:
detecting and discarding a Trail Deviation that is not part of said single unified walking trail, by: detecting that at least N different travelers walked separately along a particular trail and generally followed a same trail;
detecting that a particular traveler has deviated from the trail for a limited period of time that is less than M seconds;
analyzing location-based data of said particular traveler; determining that the deviation of said particular traveler does not reflect the actual trail being mapped; determining that the actual trail should not reflect the walking deviation of said particular traveler; and generating a correct walking trail without said deviation.

12. The method of claim 1, wherein step (d) comprises:
determining which route-segment said traveler took, when he moved from the first geographical point to the second geographical point, based on user-specific information that was indicated by said traveler with regard to disability or special accommodations.

13. The method of claim 1, wherein step (d) comprises:

determining which route-segment said traveler took, when he moved from the first geographical point to the second geographical point, based on user-specific information that was not explicitly indicated by said traveler, and based on analysis of historical data of previous routes that were traveled by said traveler;

wherein said analysis indicates that said traveler typically selects a difficult walking trail over an easy walking trail; and determining that said traveler took a difficult walking trail and not an easy walking trail when he moved from the first geographical point to the second geographical point.

14. The method of claim 1, wherein step (d) comprises:

determining which route-segment said traveler took, when he moved from the first geographical point to the second geographical point, based on user-specific information that was not explicitly indicated by said traveler, based on analysis of historical data of previous routes that were traveled by said traveler;

wherein said analysis indicates that said traveler typically selects an easy walking trail over a difficult walking trail; and determining that said traveler took an easy walking trail and not a difficult walking trail when he moved from the first geographical point to the second geographical point.

15. The method of claim 1, comprising:

generating for said traveler route-guidance information (I) that indicates to said traveler that the traveler is currently deviating from the correct route to the second geographical point, and (II) that depict to the traveler his current deviation relative to the correct route, and (III) that provides to said traveler corrective ad-hoc route-guidance to get back on the right track and to correct said current deviation, and (IV) that provides ongoing feedback to the traveler as he corrects his deviation.

16. The method of claim 1, comprising:

generating and displaying to a deviating user, that deviated from a correct route to his intended destination, (I) a first on-screen line indicating the correct route to be taken, and (II) a second, differently looking, concurrent, on-screen line that indicates the deviated route that is currently being taken by the deviating user, and (III) a first Factual Navigation Arrow that points at the current actual direction that is currently engaged by the deviating user, and (IV) another, concurrent, differently looking, Corrective Navigation Arrow that indicates to the deviating user which direction to take temporarily in order to correct his deviation from the correct route.

17. The method of claim 1, comprising:

(A) analyzing current geo-location data of said traveler;

(B) detecting that said traveler currently deviates from a planned route that leads towards an intended destination point;

(C) displaying a first on-screen indication of said planned route, and concurrently displaying a second, different, on-screen indication of a deviated segment that said traveler used;

(D) displaying an on-screen Factual Arrow that indicates an actual direction-of-progression of said traveler; and concurrently, displaying an on-screen Corrective Arrow that indicates a direction-of-corrective-progression that said traveler should take in order to correct a deviation from said planned route.

* * * * *